United States Patent
Hayashita et al.

(10) Patent No.: US 9,932,879 B2
(45) Date of Patent: Apr. 3, 2018

(54) CONTROLLER FOR INTERNAL COMBUSTION ENGINE

(71) Applicant: Toyota Jidosha Kabushiki Kaisha, Toyota-shi Aichi-ken (JP)

(72) Inventors: Go Hayashita, Chigasaki (JP); Koji Ide, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 57 days.

(21) Appl. No.: 15/190,224

(22) Filed: Jun. 23, 2016

(65) Prior Publication Data

US 2016/0376974 A1    Dec. 29, 2016

(30) Foreign Application Priority Data

Jun. 26, 2015   (JP) .................. 2015-129302

(51) Int. Cl.
  *F01N 11/00*    (2006.01)
  *F01N 13/00*    (2010.01)
  (Continued)

(52) U.S. Cl.
  CPC ............ *F01N 11/007* (2013.01); *F01N 3/101* (2013.01); *F01N 9/00* (2013.01); *F01N 2430/06* (2013.01);
  (Continued)

(58) Field of Classification Search
  CPC ...... F01N 11/007; F01N 13/008; F01N 3/101; F01N 3/2006; F01N 9/00; F01N 2430/06;
  (Continued)

(56) References Cited

U.S. PATENT DOCUMENTS

2011/0224851 A1*  9/2011  Jacques ............ B60K 6/48
                                                  701/22
2011/0296818 A1   12/2011  Hashimoto et al.
(Continued)

FOREIGN PATENT DOCUMENTS

JP    H0988688 A    3/1997
JP    2002-070612 A  3/2002
(Continued)

*Primary Examiner* — Brandon Lee
(74) *Attorney, Agent, or Firm* — Dinsmore & Shohl LLP

(57) ABSTRACT

An automatically stoppable internal combustion engine comprises an exhaust purification catalyst, an upstream side air-fuel ratio sensor, a downstream side air-fuel ratio sensor, and sensor heaters heating air-fuel ratio sensors. A controller comprises an air-fuel ratio control part and a heating control part. The heating control part controls the temperature of the upstream side air-fuel ratio sensor to the activation temperature or more and the temperature of the downstream side air-fuel ratio sensor to less than the activation temperature during automatic stop of the internal combustion engine. The air-fuel ratio control part controls the air-fuel ratio of the exhaust gas based on the outputs of the two air-fuel ratio sensors during engine operation and controls the air-fuel ratio of the exhaust gas temporarily based on the output of the upstream side air-fuel ratio sensor without using the output of the downstream side air-fuel ratio sensor.

5 Claims, 11 Drawing Sheets

(51) Int. Cl.
  *F01N 3/10* (2006.01)
  *F01N 3/20* (2006.01)
  *F01N 9/00* (2006.01)

(52) U.S. Cl.
  CPC .... *F01N 2560/025* (2013.01); *F01N 2560/06* (2013.01); *F01N 2560/14* (2013.01); *F01N 2560/20* (2013.01); *F01N 2590/11* (2013.01); *F01N 2900/0416* (2013.01); *F01N 2900/1402* (2013.01); *Y02T 10/22* (2013.01); *Y02T 10/47* (2013.01)

(58) Field of Classification Search
  CPC ........... F01N 2560/025; F01N 2560/06; F01N 2560/14; F01N 2560/20; F01N 2570/16; F01N 2590/11; F01N 2900/0416; F01N 2900/1402; Y02T 10/22; Y02T 10/47
  See application file for complete search history.

(56) References Cited

U.S. PATENT DOCUMENTS

| | | |
|---|---|---|
| 2012/0215426 A1 | 8/2012 | Sato et al. |
| 2016/0061084 A1 | 3/2016 | Okazaki et al. |

FOREIGN PATENT DOCUMENTS

| | | |
|---|---|---|
| JP | 2010-185386 A | 8/2010 |
| JP | 2011-252470 A | 12/2011 |
| JP | 2012-172592 A | 9/2012 |
| JP | 2015-094331 A | 5/2015 |
| JP | 2015-101992 A | 6/2015 |
| WO | 2014/118892 A1 | 8/2014 |

\* cited by examiner

CONTROLLER FOR INTERNAL COMBUSTION ENGINE

CROSS-REFERENCE TO RELATED APPLICATIONS

This application claims priority to Japanese Patent Application No. 2015-129302 filed on Jun. 26, 2015, the entire contents of which are hereby incorporated by reference.

TECHNICAL FIELD

Embodiments of the present disclosure relates to a controller for an internal combustion engine.

BACKGROUND ART

Japanese Patent Publication No. 2010-185386A discloses a controller used in an automatically stoppable internal combustion engine provided with an exhaust purification catalyst provided in an exhaust passage of an internal combustion engine, an upstream side air-fuel ratio sensor provided in the exhaust passage at the upstream side of the exhaust purification catalyst in the direction of flow of exhaust, a downstream side air-fuel ratio sensor provided in the exhaust passage at the downstream side of the exhaust purification catalyst in the direction of flow of exhaust, an upstream side sensor heater heating the upstream side air-fuel ratio sensor, and a downstream side sensor heater heating the downstream side air-fuel ratio sensor.

In this controller, for example, while the internal combustion engine is stopped, the upstream side sensor heater and downstream side sensor heater do not heat the upstream side air-fuel ratio sensor and downstream side air-fuel ratio sensor. Further, when cold starting the internal combustion engine or when restarting the internal combustion engine stopped by the automatic stop function, the upstream side sensor heater and the downstream side sensor heater are used to heat the upstream side air-fuel ratio sensor and downstream side air-fuel ratio sensor. In particular, the controller described in Japanese Patent Publication No. 2010-185386A, the heating of the upstream side air-fuel ratio sensor and downstream side air-fuel ratio sensor at startup or after startup of the internal combustion engine is controlled in accordance with the stopped state of the internal combustion engine, the stopped time of the internal combustion engine, etc. According to the controller described in Japanese Patent Publication No. 2010-185386A, due to this, it is considered possible to prevent breakdown of an air-fuel ratio sensor due to the condensed water remaining in the exhaust system.

SUMMARY

In this regard, in the controller described in Japanese Patent Publication No. 2010-185386A, the air-fuel ratio sensors are not heated by the sensor heaters while the internal combustion engine is stopped. The air-fuel ratio sensors are heated after restart of the internal combustion engine. However, when the temperature of an air-fuel ratio sensor is less than the activation temperature, a certain extent of time is taken for a sensor heater to raise the air-fuel ratio sensor to the activation temperature or more. Therefore, if, during stopping of the internal combustion engine by the automatic stop function, the temperature of an air-fuel ratio sensor ends up falling to less than the activation temperature, a certain extent of time is taken until the temperature of the air-fuel ratio sensor rises to the activation temperature or more after restart of the internal combustion engine. For this reason, for a certain extent of time after restart of the internal combustion engine, the two air-fuel ratio sensors of the upstream side air-fuel ratio sensor and downstream side air-fuel ratio sensor cannot accurately detect the air-fuel ratio of the exhaust gas. Accordingly, the air-fuel ratio of the exhaust gas can no longer be suitably controlled.

On the other hand, during stopping of the internal combustion engine by the automatic stop function, it may be considered to heat the upstream side air-fuel ratio sensor and downstream side air-fuel ratio sensor by sensor heaters and maintain the temperatures of these air-fuel ratio sensors at the activation temperature or more even while the internal combustion engine is stopped. However, to maintain the temperatures of the two air-fuel ratio sensors at the activation temperature or more constantly even during stopping of the internal combustion engine by the automatic stop function, a large electric power is required for the sensor heaters. In the end, this leads to deterioration of the fuel economy of the internal combustion engine.

Therefore, in view of the above problem, an object of the present disclosure is to provide a controller for an internal combustion engine able to keep the power consumption by the sensor heaters small while suitably controlling the air-fuel ratio of the exhaust gas right after engine restart. The present disclosure was made to solve the above problem and has as its gist the following:

(1) A controller for an internal combustion engine which has automatic stop function equipped with: an exhaust purification catalyst provided in an exhaust passage; an upstream side air-fuel ratio sensor provided in the exhaust passage at an upstream side of the exhaust purification catalyst in the direction of flow of exhaust; a downstream side air-fuel ratio sensor provided in the exhaust passage at a downstream side of the exhaust purification catalyst in the direction of flow of exhaust; an upstream side sensor heater heating the upstream side air-fuel ratio sensor; and a downstream side sensor heater heating the downstream side air-fuel ratio sensor, comprising: an air-fuel ratio control part configured to control an air-fuel ratio of exhaust gas flowing into the exhaust purification catalyst; and a heating control part configured to control heating of the upstream side air-fuel ratio sensor by the upstream side sensor heater and heating of the downstream air-fuel sensor by the downstream side sensor heater, wherein the heating control part is further configured to control the upstream side sensor heater and the downstream side sensor heater so that the temperature of the upstream side air-fuel ratio sensor reaches the activation temperature or more and so that the temperature of the downstream side air-fuel ratio sensor reaches less than the activation temperature during automatic stop of the internal combustion engine, and the air-fuel ratio control part is further configured to: control the air-fuel ratio of the exhaust gas flowing into the exhaust purification catalyst based on an output of the upstream side air-fuel ratio sensor and an output of the downstream side air-fuel ratio sensor during engine operation; and control the air-fuel ratio of the exhaust gas flowing into the exhaust purification catalyst temporarily based on the output of the upstream side air-fuel ratio sensor without using the output of the downstream side air-fuel ratio sensor even during engine operation when the internal combustion engine is restarted after automatic stop.

(2) The controller for the internal combustion engine according to the above (1) wherein the heating control part is further configured to control the upstream side sensor heater so that the temperature of the upstream side air-fuel ratio sensor reaches lower during automatic stop of the internal combustion engine compared with during engine operation.

(3) The controller for the internal combustion engine according to the above (2) wherein the heating control part is further configured to: control the temperature of the upstream side air-fuel ratio sensor to a first temperature or to more during engine operation; and control the temperature of the upstream side air-fuel ratio sensor to less than the first temperature and equal to or more than an activation temperature during the automatic stop, and the first temperature is a temperature by which a limit current can be generated even if atmospheric gas flows around the upstream side air-fuel ratio sensor.

(4) The controller for the internal combustion engine according to any one of the above (1) to (3) wherein the heating control part is further configured to control the downstream side sensor heater so that the temperature of the downstream side air-fuel ratio sensor reaches an activation temperature or more after the internal combustion engine is restarted after automatic stop and the air-fuel ratio control part is further configured to control the air-fuel ratio of the exhaust gas flowing into the exhaust purification catalyst based on the output of the upstream side air-fuel ratio sensor without using the output of the downstream side air-fuel ratio sensor until the temperature of the downstream side air-fuel ratio sensor reaches the activation temperature or more when the internal combustion engine is restarted after automatic stop.

(5) The controller for an internal combustion engine according to the above (1) wherein the air-fuel ratio control part is further configured to control the air-fuel ratio of the exhaust gas flowing in so that the air-fuel ratio corresponding to the output of the upstream side air-fuel ratio sensor becomes the stoichiometric air-fuel ratio when controlling the air-fuel ratio of the exhaust gas flowing into the exhaust purification catalyst based on the output of the upstream side air-fuel ratio sensor without using the output of the downstream side air-fuel ratio sensor.

(6) The controller for an internal combustion engine according to the above (1) wherein the air-fuel ratio control part is further configured to control the air-fuel ratio of the exhaust gas flowing in so that the air-fuel ratio corresponding to the output of the upstream side air-fuel ratio sensor alternately changes between a rich air-fuel ratio richer than the stoichiometric air-fuel ratio and a lean air-fuel ratio leaner than the stoichiometric air-fuel ratio when controlling the air-fuel ratio of the exhaust gas flowing into the exhaust purification catalyst based on the output of the upstream side air-fuel ratio sensor and the output of the downstream side air-fuel ratio sensor.

According to embodiments for the present disclosure, a control device of an internal combustion engine able to keep the power consumption by the sensor heaters small while suitably controlling the air-fuel ratio of the exhaust gas right after engine restart is provided.

DESCRIPTION OF EMBODIMENTS

Figure 1:
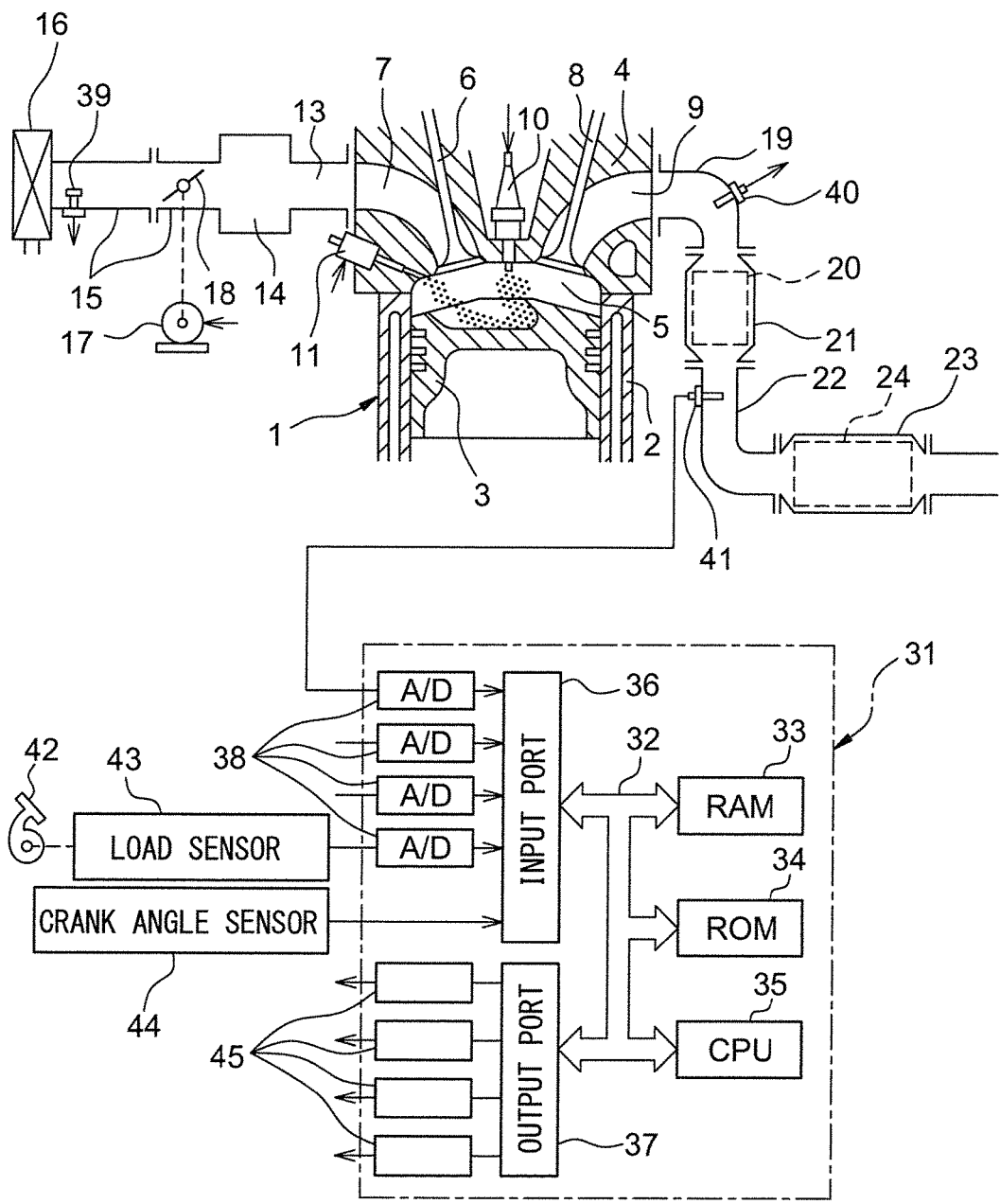
FIG. 1 is a view schematically showing an internal combustion engine in which an abnormality diagnosis system of the present disclosure is used.

Below, referring to the drawings, embodiments of the present disclosure will be explained in detail. Note that, in the following explanation, similar component elements are assigned the same reference notations.

<Explanation of Internal Combustion Engine as a Whole>

FIG. 1 is a view schematically showing an internal combustion engine in which a controller according to a first embodiment of the present disclosure is used. Referring to FIG. 1, 1 indicates an engine body, 2 a cylinder block, 3 a piston reciprocating inside the cylinder block 2, 4 a cylinder head fastened on the cylinder block 2, 5 a combustion chamber formed between a piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. At a circumferential part at the inside wall surface of the cylinder head 4, a fuel injector 11 is arranged. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged to inject fuel into the intake port 7. Further, in the present embodiment, as the fuel, gasoline with a stoichiometric air-fuel ratio of 14.6 is used. However, in the internal combustion engine in which the exhaust purification system of the present disclosure is used, a fuel other than gasoline or mixed fuel with gasoline may also be used.

The intake ports 7 of the cylinders are connected through respectively corresponding intake runners 13 to a surge tank 14, while the surge tank 14 is connected through an intake pipe 15 to the air cleaner 16. The intake ports 7, intake runners 13, surge tank 14, and intake pipe 15 form the intake passage. Further, inside the intake pipe 15, a throttle valve 18 driven by a throttle valve driving actuator 17 is arranged. The throttle valve 18 can be made to pivot by the throttle valve driving actuator 17 whereby the opening area of the intake passage can be changed.

On the other hand, the exhaust ports 9 of the cylinders are connected to an exhaust manifold 19. The exhaust manifold 19 has a plurality of runners which are connected to the individual exhaust ports 9 and a header at which these runners merge. The header of the exhaust manifold 19 is connected to an upstream side casing 21 in which an upstream side exhaust purification catalyst 20 is provided. The upstream side casing 21 is connected through an exhaust pipe 22 to a downstream side casing 23 having a built-in downstream side exhaust purification catalyst 24. The exhaust ports 9, exhaust manifold 19, upstream side casing 21, exhaust pipe 22, and downstream side casing 23 form the exhaust passage.

The electronic control unit (ECU) 31 is comprised of a digital computer provided with parts connected with each other through a bidirectional bus 32 such as a RAM (random access memory) 33, ROM (read only memory) 34, CPU (microprocessor) 35, input port 36, and output port 37. Inside the intake pipe 15, an air flow meter 39 for detecting the flow rate of air flowing through the inside of the intake pipe 15 is arranged. The output of this air flow meter 39 is input through a corresponding AD converter 38 to the input port 36. Further, at the header of the exhaust manifold 19, an upstream side air-fuel ratio sensor 40 detecting the air-fuel ratio of the exhaust gas flowing through the inside of the exhaust manifold 19 (that is, the exhaust gas flowing into the upstream side exhaust purification catalyst 20) is arranged. In addition, inside of the exhaust pipe 22, a downstream side air-fuel ratio sensor 41 detecting the air-fuel ratio of the exhaust gas flowing through the inside of the exhaust pipe 22 (that is, the exhaust gas flowing out from the upstream side exhaust purification catalyst 20 and flowing into the downstream side exhaust purification catalyst 24) is arranged. The outputs of these air-fuel ratio sensors 40 and 41 are also input through the corresponding AD converters 38 to the input port 36. Note that the configurations of these air-fuel ratio sensors 40 and 41 will be explained later.

Further, an accelerator pedal 42 is connected to a load sensor 43 generating an output voltage proportional to the amount of depression of the accelerator pedal 42, while the output voltage of the load sensor 43 is input through a corresponding AD converter 38 to the input port 36. The crank angle sensor 44, for example, generates an output pulse every time the crankshaft rotates by 15 degrees. This output pulse is input to the input port 36. The CPU 35 uses the output pulses of this crank angle sensor 44 to calculate the engine speed. On the other hand, the output port 37 is connected through a corresponding drive circuit 45 to the spark plugs 10, fuel injectors 11, and throttle valve driving actuator 17.

<Explanation of Exhaust Purification Catalyst>

The upstream side exhaust purification catalyst 20 and downstream side exhaust purification catalyst 24 are three-way catalysts having oxygen storage abilities. Specifically, the exhaust purification catalysts 20 and 24 are three-way catalysts comprised of carriers made of ceramics on which precious metals which have catalytic actions (for example, platinum (Pt)) and substances which have oxygen storage abilities (for example, ceria ($CeO_2$)) are carried. Three-way catalysts have the functions of simultaneously removing unburned HC, CO, etc. (below referred to as "unburned gas") and $NO_x$ if the air-fuel ratio of the exhaust gas which flows into the three-way catalysts is maintained at the stoichiometric air-fuel ratio. In addition, when the exhaust purification catalysts 20 and 24 store certain extents of oxygen, the unburned gas and $NO_x$ are simultaneously removed even if the air-fuel ratio of the exhaust gas which flows into the exhaust purification catalysts 20 and 24 deviates somewhat to the rich side or lean side from the stoichiometric air-fuel ratio.

That is, if the exhaust purification catalysts 20 and 24 have oxygen storage abilities, that is, if the oxygen storage amounts of the exhaust purification catalysts 20 and 24 are smaller than the maximum storable oxygen amounts, when the air-fuel ratios of the exhaust gas flowing into the exhaust purification catalysts 20 and 24 become somewhat leaner than the stoichiometric air-fuel ratio, the excess oxygen contained in the exhaust gas is stored in the exhaust purification catalysts 20 and 24. For this reason, the surfaces of the exhaust purification catalysts 20 and 24 are maintained at the stoichiometric air-fuel ratio. As a result, the unburned gas and $NO_x$ are simultaneously removed from the surfaces of the exhaust purification catalysts 20 and 24. At this time, the air-fuel ratios of the exhaust gas flowing out from the exhaust purification catalysts 20 and 24 become the stoichiometric air-fuel ratios.

On the other hand, if the exhaust purification catalysts 20 and 24 are in states enabling the release of oxygen, that is, the oxygen storage amounts of the exhaust purification catalysts 20 and 24 are larger than 0, when the air-fuel ratios of the exhaust gas flowing into the exhaust purification catalysts 20 and 24 become somewhat richer than the stoichiometric air-fuel ratio, the amount of oxygen lacking for reducing the unburned gas contained in the exhaust gas is released from the exhaust purification catalysts 20 and 24. For this reason, in this case as well, the surfaces of the exhaust purification catalysts 20 and 24 are maintained at the stoichiometric air-fuel ratio. As a result, the surfaces of the exhaust purification catalysts 20 and 24 are simultaneously cleared of unburned gas and $NO_x$. At this time, the air-fuel ratios of the exhaust gas flowing out from the exhaust purification catalysts 20 and 24 become the stoichiometric air-fuel ratio.

In this way, when the exhaust purification catalysts 20 and 24 store certain extents of oxygen, even if the air-fuel ratios of the exhaust gas flowing into the exhaust purification catalysts 20 and 24 deviate somewhat to the rich side or lean side from the stoichiometric air-fuel ratio, the unburned gas and $NO_x$ are simultaneously removed and the air-fuel ratios of the exhaust gas flowing out from the exhaust purification catalysts 20 and 24 become the stoichiometric air-fuel ratio.

<Explanation of Air-Fuel Ratio Sensors>

In the present embodiment, as the air-fuel ratio sensors 40 and 41, cup-shaped limit current type air-fuel ratio sensors are used. Using FIG. 2, the structures of the air-fuel ratio sensors 40 and 41 will be simply explained. Each of the air-fuel ratio sensors 40 and 41 is provided with a solid electrolyte layer 51, an exhaust side electrode 52 arranged on one side surface of the same, an atmosphere side electrode 53 arranged on the other side surface of the same, a diffusion regulating layer 54 regulating diffusion of the exhaust gas passing through it, a reference gas chamber 55, and a heater part 56 heating the air-fuel ratio sensor 40 or 41, in particular, heating the solid electrolyte layer 51.

In particular, in the cup-shaped air-fuel ratio sensor 40 or 41 of the present embodiment, the solid electrolyte layer 51 is formed into a cylindrical shape with one closed end. Inside the reference gas chamber 55 defined inside of the solid electrolyte layer 51, atmospheric gas (air) is introduced and the heater part 56 are arranged. At the inner surface of the solid electrolyte layer 51, the atmosphere side electrode 53 is arranged, while at the outer surface of the solid electrolyte layer 51, the exhaust side electrode 52 is arranged. On the outer surfaces of the solid electrolyte layer 51 and exhaust side electrode 52, the diffusion regulating layer 54 is arranged so as to cover these. Note that, at the outside of the diffusion regulating layer 54, a protective layer (not shown) for preventing liquid etc. from depositing on the surface of the diffusion regulating layer 54 may be provided.

The solid electrolyte layer 51 is formed by a sintered body of oxygen ion-conducting oxides comprised of $ZrO_2$ (zirconia), $HfO_2$, $ThO_2$, $Bi_2O_3$, etc. in which CaO, MgO, $Y_2O_3$, $Yb_2O_3$, etc. is included as a stabilizer. Further, the diffusion regulating layer 54 is formed by a porous sintered body of alumina, magnesia, silica, spinel, mullite, or other heat resistant inorganic substance. Furthermore, the exhaust side electrode 52 and atmosphere side electrode 53 are formed by platinum or another high catalytic activity precious metal.

Further, an applied voltage control device 60 mounted in the ECU 31 applies a sensor applied voltage V between the exhaust side electrode 52 and the atmosphere side electrode 53. In addition, the ECU 31 is provided with a current detection part 61 detecting the current I flowing through the solid electrolyte layer 51 across the electrodes 52 and 53 when applying the sensor applied voltage V. The current detected by this current detection part 61 is the output current I of the air-fuel ratio sensor 40 or 41.

Figure 3:
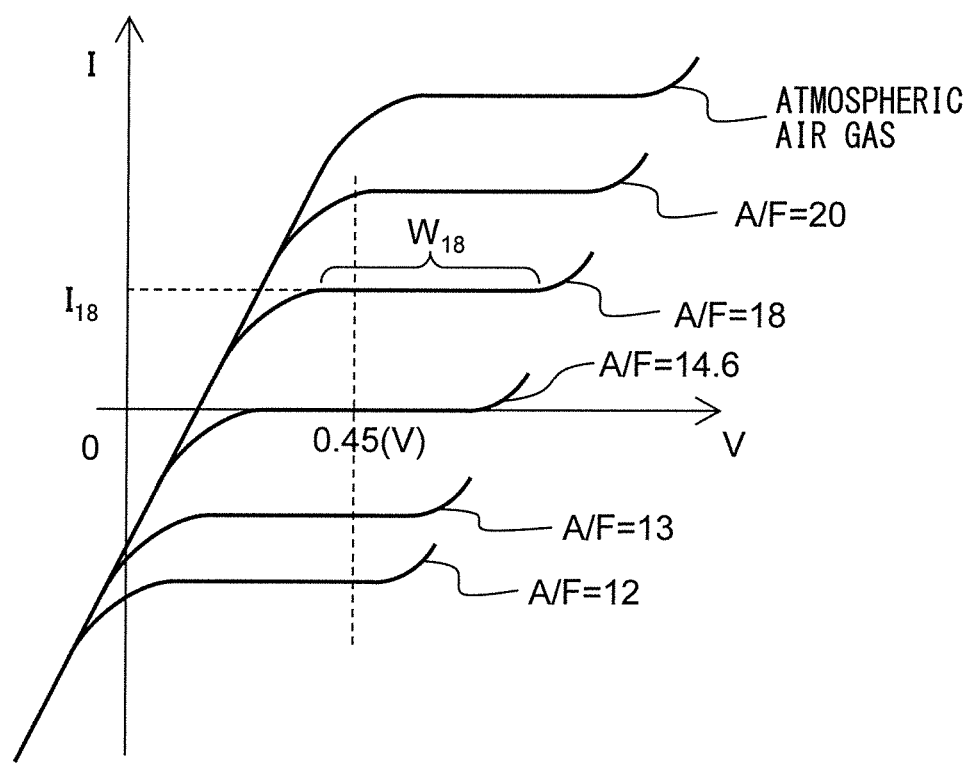
FIG. 3 is a view showing a relationship of an applied voltage V and output current I at different exhaust air-fuel ratios A/F.

The thus configured air-fuel ratio sensors 40 and 41 have voltage-current (V-I) characteristics such as shown in FIG. 3. As will be understood from FIG. 3, the output currents I of the air-fuel ratio sensors 40 and 41 become larger the higher the air-fuel ratio of the exhaust gas, that is, the exhaust air-fuel ratio A/F (the leaner). Further, the V-I line at each exhaust air-fuel ratio A/F has a region parallel to the sensor applied voltage V axis, that is, a region where the output current I does not change much even if the sensor applied voltage V changes. This voltage region is called the "limit current region", while the current at this time is called the "limit current". In FIG. 3, the limit current region and limit current when the exhaust air-fuel ratio is 18 are respectively shown by $W_{18}$ and $I_{18}$.

Figure 4:
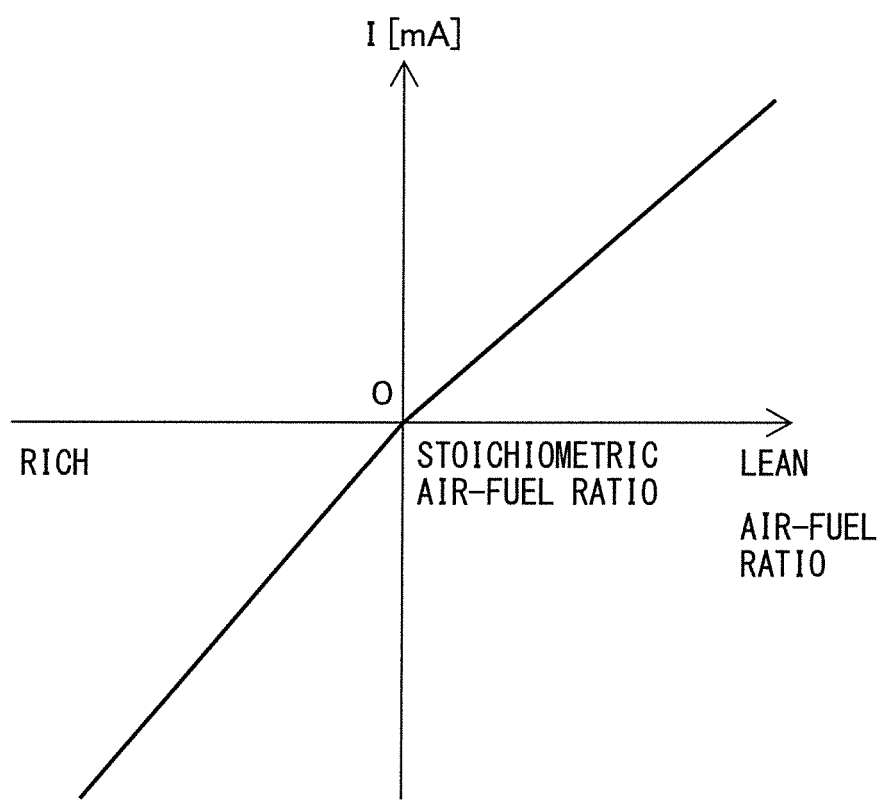
FIG. 4 is a view showing a relationship of an air-fuel ratio and output current I when making an applied voltage V constant.

FIG. 4 shows the relationship between the exhaust air-fuel ratio and output current I when making the applied voltage V constant at 0.45V or so (FIG. 3). As will be understood from FIG. 4, at the air-fuel ratio sensors 40 and 41, the output currents change linearly (proportionally) with respect to the exhaust air-fuel ratio so that the higher the exhaust air-fuel ratio (that is, the leaner), the larger the output currents I from the air-fuel ratio sensors 40 and 41. In addition, the air-fuel ratio sensors 40 and 41 are configured so that the output currents I become zero when the exhaust air-fuel ratio is the stoichiometric air-fuel ratio.

Figure 2:
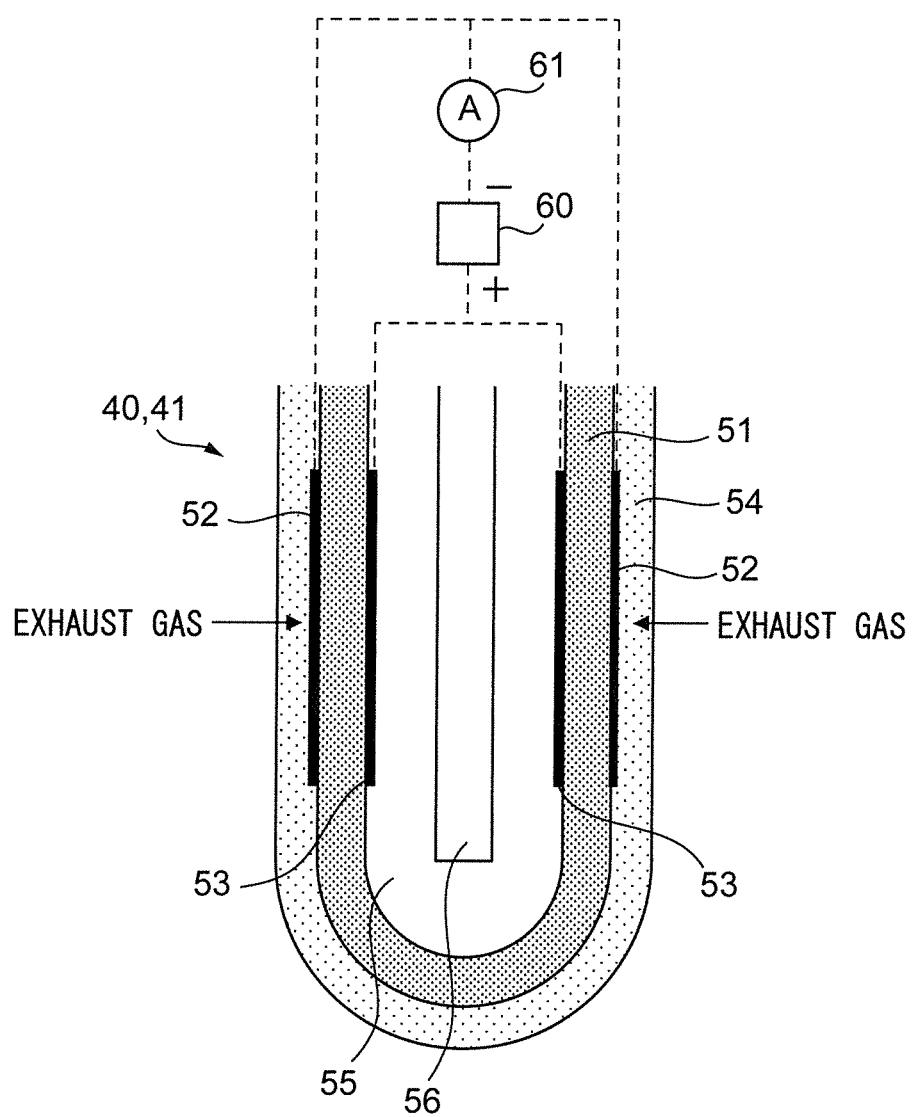
FIG. 2 is a schematic cross-sectional view of an air-fuel ratio sensor.

Note that, as the air-fuel ratio sensors 40 and 41, instead of the limit current type air-fuel ratio sensors of the structures shown in FIG. 2, for example, stacked structure limit current type air-fuel ratio sensors or other structures of limit current type air-fuel ratio sensors may be used. Further, as the air-fuel ratio sensors 40 and 41, it is also possible to use oxygen sensors which detect the concentration of oxygen without applying voltage between the electrodes.

<Air-Fuel Ratio Control at Normal Time>

Next, the air-fuel ratio control at the normal time in the controller for an internal combustion engine of the present embodiment (below, referred to as "normal air-fuel ratio control") will be explained in brief. In the normal air-fuel ratio control of the present embodiment, feedback control controlling the amount of fuel injection from the fuel injector 11 is performed based on the air-fuel ratio corresponding to the output of the upstream side air-fuel ratio sensor 40 (below, referred to as the "output air-fuel ratio") so that the output air-fuel ratio of the upstream side air-fuel ratio sensor 40 becomes the target air-fuel ratio. That is, in normal air-fuel ratio control of the present embodiment, feedback control is performed based on the output air-fuel ratio of the upstream side air-fuel ratio sensor 40 so that the air-fuel ratio of the exhaust gas flowing into the upstream side exhaust purification catalyst 20 becomes the target air-fuel ratio. Note that, "output air-fuel ratio" means an air-fuel ratio corresponding to the output value of the air-fuel ratio sensor.

Further, in normal air-fuel ratio control of the present embodiment, the target air-fuel ratio is set based on the output air-fuel ratio of the downstream side air-fuel ratio sensor 41 etc. Specifically, when the output air-fuel ratio of the downstream side air-fuel ratio sensor 41 becomes the rich air-fuel ratio, the target air-fuel ratio is set to the lean set air-fuel ratio. As a result, the air-fuel ratio of the exhaust gas flowing into the upstream side exhaust purification catalyst 20 also becomes a lean set air-fuel ratio. Here, the "lean set air-fuel ratio" is a predetermined constant value of air-fuel ratio a certain extent leaner than the stoichiometric air-fuel ratio (air-fuel ratio forming control center), for example, is made 14.75. In addition, in the present embodiment, when the output air-fuel ratio of the downstream side air-fuel ratio sensor 41 becomes a rich judged air-fuel ratio slightly richer than the stoichiometric air-fuel ratio (for example, 14.55) or becomes less, it is judged that the output air-fuel ratio of the downstream side air-fuel ratio sensor 41 has become the rich air-fuel ratio.

In addition, in normal air-fuel ratio control of the present embodiment, if the oxygen storage amount OSA of the upstream side exhaust purification catalyst 20 becomes a predetermined switching reference storage amount Cref smaller than the maximum storable oxygen amount Cmax or becomes more, the target air-fuel ratio, which had up to then been the lean set air-fuel ratio, is set to the rich set air-fuel ratio. As a result, the air-fuel ratio of the exhaust gas flowing into the upstream side exhaust purification catalyst 20 also becomes the rich set air-fuel ratio. Here, the "rich set air-fuel ratio" is a predetermined air-fuel ratio a certain extent richer than the stoichiometric air-fuel ratio (air-fuel ratio forming control center), for example, is made 14.50. Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or less.

Note that, the oxygen storage amount OSA of the upstream side exhaust purification catalyst 20 is estimated based on the cumulative value of the oxygen excess/deficiency of the exhaust gas flowing into the upstream side exhaust purification catalyst 20. Here, the "oxygen excess/deficiency" means the amount of oxygen which becomes in excess or the amount of oxygen which becomes deficient (amount of unburned gas in excess) when trying to make the air-fuel ratio of the exhaust gas flowing into the upstream side exhaust purification catalyst 20 the stoichiometric air-fuel ratio. In particular, in the time period where the target air-fuel ratio is set to the lean set air-fuel ratio, the oxygen in the exhaust gas flowing into the upstream side exhaust purification catalyst 20 becomes excessive. This excess oxygen is stored in the upstream side exhaust purification catalyst 20. Therefore, the cumulative value of the oxygen excess/deficiency in this time period (below, referred to as "cumulative oxygen excess/deficiency") can be said to be the estimated value of the oxygen storage amount OSA of the upstream side exhaust purification catalyst 20.

The oxygen excess/deficiency is calculated based on the output air-fuel ratio of the upstream side air-fuel ratio sensor 40 and the estimated value of the amount of intake air to a combustion chamber 5 calculated based on the output etc. of the air flow meter 39 or amount of feed of fuel from a fuel injector 11 etc. Specifically, the oxygen excess/deficiency OED, for example, is calculated by the following formula (1).

$$OED = 0.23 \times Qi \times (AFup - AFR) \quad (1)$$

Here, 0.23 shows the concentration of oxygen in the air, Qi shows the fuel injection amount, AFup shows the output air-fuel ratio of the upstream side air-fuel ratio sensor 40, and AFR shows the air-fuel ratio becoming the control center (in the present embodiment, basically the stoichiometric air-fuel ratio).

After that, if the output air-fuel ratio of the downstream side air-fuel ratio sensor 41 again becomes the rich judged air-fuel ratio or less, the target air-fuel ratio is again made the lean set air-fuel ratio. After that, a similar operation is repeated. In this way, in the present embodiment, the target air-fuel ratio of the exhaust gas flowing into the upstream side exhaust purification catalyst 20 is alternately repeatedly set to the lean set air-fuel ratio and rich set air-fuel ratio. In other words, in the present embodiment, the output air-fuel ratio of the upstream side air-fuel ratio sensor 40 (that is, the air-fuel ratio of the exhaust gas flowing into the upstream side exhaust purification catalyst 20) is alternately switched between the rich air-fuel ratio and lean air-fuel ratio.

<Explanation of Normal Air-Fuel Ratio Control Using Time Chart>

Figure 5:
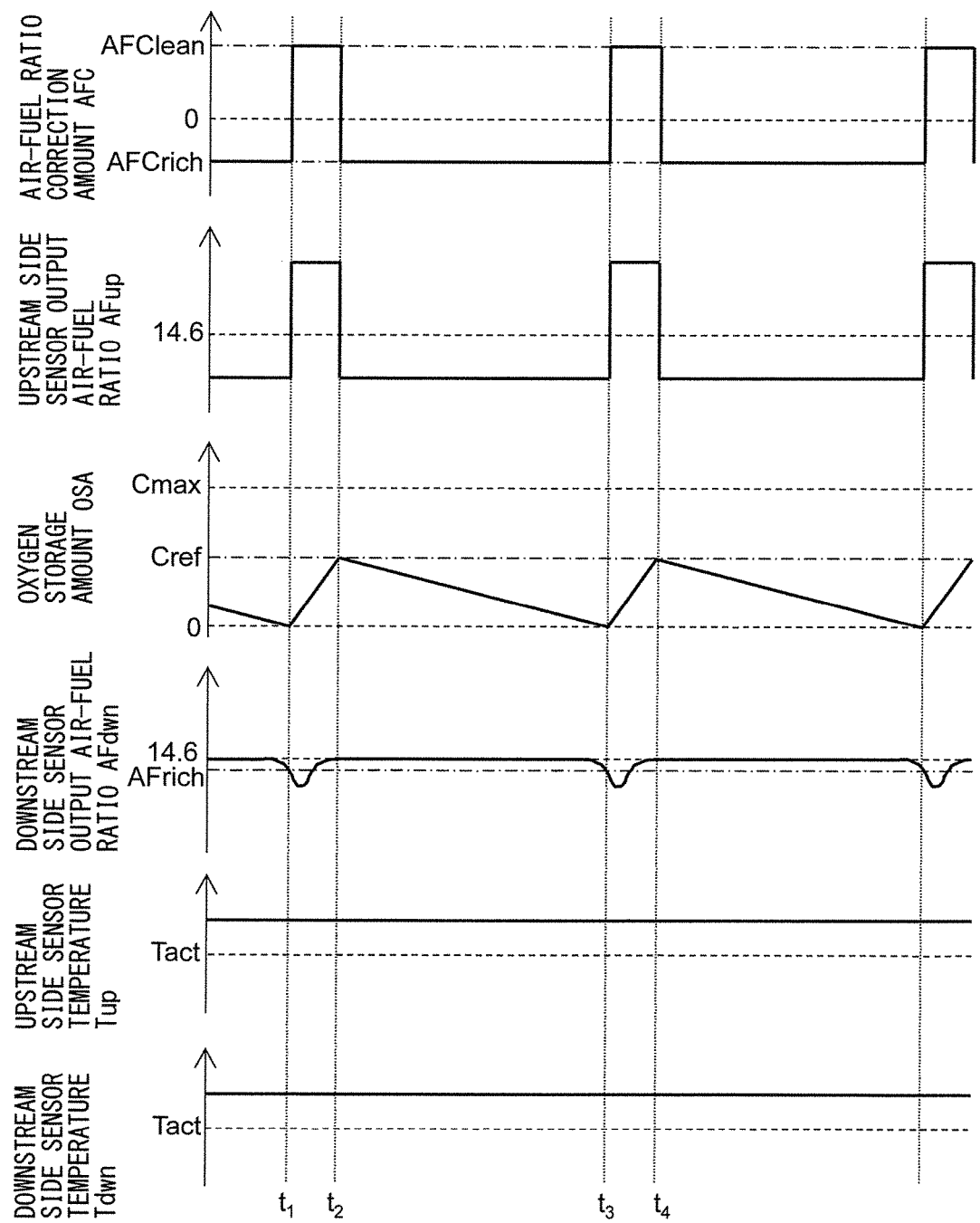
FIG. 5 is a time chart showing a change of an air-fuel ratio correction amount etc. in the case of performing normal air-fuel ratio control.

Referring to FIG. 5, the above-mentioned operation will be specifically explained. FIG. 5 is a time chart of parameters in the case of performing normal air-fuel ratio control of the present embodiment such as the air-fuel ratio correction amount AFC, the output air-fuel ratio AFup of the upstream side air-fuel ratio sensor 40, the oxygen storage amount OSA of the upstream side exhaust purification catalyst 20, the output air-fuel ratio AFdwn of the downstream side air-fuel ratio sensor 41, the temperature Tup of the upstream side air-fuel ratio sensor 40, and the temperature Tdwn of the downstream side air-fuel ratio sensor 41.

Note that, the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is made an air-fuel ratio (in the present embodiment, stoichiometric air-fuel ratio) equal to the air-fuel ratio forming the control center (below, referred to as "control center air-fuel ratio"). On the other hand, when the air-fuel ratio correction amount AFC is a positive value, the target air-fuel ratio becomes an air-fuel ratio leaner than the control center air-fuel ratio (in the present embodiment, lean air-fuel ratio), while when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means an air-fuel ratio to which the air-fuel ratio correction amount AFC is added in accordance with the engine operation state, that is, an air-fuel ratio becoming the reference when making the target air-fuel ratio change according to the air-fuel ratio correction amount AFC.

In the illustrated example, in the state before the time $t_1$, the air-fuel ratio correction amount AFC is made the rich set correction amount AFCrich (corresponding to rich set air-fuel ratio). That is, the target air-fuel ratio is made the rich air-fuel ratio. Along with this, the output air-fuel ratio of the upstream side air-fuel ratio sensor 40 becomes the rich air-fuel ratio. The unburned gas contained in the exhaust gas flowing into the upstream side exhaust purification catalyst 20 is removed by the upstream side exhaust purification catalyst 20. Along with this, the oxygen storage amount OSA of the upstream side exhaust purification catalyst 20 gradually decreases. Due to the purification action at the upstream side exhaust purification catalyst 20, the exhaust gas flowing out from the upstream side exhaust purification catalyst 20 does not contain unburned gas etc., so the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, the oxygen storage amount OSA approaches zero. Along with this, part of the unburned gas etc. flowing into the upstream side exhaust purification catalyst 20 starts to flow out without being removed at the upstream side exhaust purification catalyst 20. Due to this, the output air-fuel ratio AFdwn of the downstream side air-fuel ratio sensor 41 gradually decreases. At the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, the oxygen storage amount OSA is made to increase by the air-fuel ratio correction amount AFC being switched to the lean set correction amount AFClean (corresponding to lean set air-fuel ratio).

At the time $t_1$, if the target air-fuel ratio is switched to the lean air-fuel ratio, the air-fuel ratio of the exhaust gas flowing into the upstream side exhaust purification catalyst 20 changes from the rich air-fuel ratio to the lean air-fuel ratio. If at the time $t_1$ the air-fuel ratio of the exhaust gas flowing into the upstream side exhaust purification catalyst 20 changes to the lean air-fuel ratio, the oxygen storage amount OSA of the upstream side exhaust purification catalyst 20 increases.

Due to this, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 converges to the stoichiometric air-fuel ratio. At this time, the air-fuel ratio of the exhaust gas flowing into the upstream side exhaust purification catalyst 20 becomes the lean air-fuel ratio, but there is sufficient extra margin in the oxygen storage ability of the upstream side exhaust purification catalyst 20, so the oxygen in the inflowing exhaust gas is stored in the upstream side exhaust purification catalyst 20 and the $NO_x$ is removed by reduction. For this reason, the discharge of $NO_x$ from the upstream side exhaust purification catalyst 20 becomes substantially zero.

After that, if the oxygen storage amount OSA of the upstream side exhaust purification catalyst 20 increases, at the time $t_2$, the oxygen storage amount OSA of the upstream side exhaust purification catalyst 20 reaches the switching reference storage amount Cref. In the present embodiment, if the estimated value of the oxygen storage amount OSA becomes the switching reference storage amount Cref or more, the storage of oxygen in the upstream side exhaust purification catalyst 20 is stopped by the air-fuel ratio correction amount AFC being switched to the rich set correction amount AFCrich. Therefore, the target air-fuel ratio is made the rich air-fuel ratio. Note that, the switching reference storage amount Cref is ¾ or less of the maximum storable oxygen amount Cmax when the upstream side exhaust purification catalyst 20 is unused, ½ or less, alternatively ⅕ or less. As a result, before the output air-fuel ratio AFdwn of the downstream side air-fuel ratio sensor 41 reaches a lean judged air-fuel ratio slightly leaner than the stoichiometric air-fuel ratio (for example, 14.65. Lean air-fuel ratio where difference from stoichiometric air-fuel ratio becomes same extent as difference between rich judged air-fuel ratio and stoichiometric air-fuel ratio), the air-fuel ratio correction amount AFC is switched to the rich set correction amount AFCrich.

At the time $t_2$, if switching the target air-fuel ratio to the rich air-fuel ratio, the air-fuel ratio of the exhaust gas flowing into the upstream side exhaust purification catalyst 20 changes from the lean air-fuel ratio to the rich air-fuel ratio. The exhaust gas flowing into the upstream side exhaust purification catalyst 20 contains unburned gas etc., so the oxygen storage amount OSA of the upstream side exhaust purification catalyst 20 gradually decreases. At this time, the discharge of $NO_x$ from the upstream side exhaust purification catalyst 20 becomes substantially zero.

If the oxygen storage amount OSA of the upstream side exhaust purification catalyst 20 gradually decreases, at the time $t_4$, in the same way as the time the output air-fuel ratio AFdwn of the downstream side air-fuel ratio sensor 41 reaches the rich judged air-fuel ratio AFrich. Due to this, the air-fuel ratio correction amount AFC is switched to the lean set correction amount AFClean. After that, the cycle of the above-mentioned times $t_1$ to $t_4$ is repeated.

As will be understood from the above explanation, according to the present embodiment, it is possible to constantly keep down the amount of discharge of $NO_x$ from the upstream side exhaust purification catalyst 20. That is, so long as performing the above-mentioned control, basically, it is possible to make the amount of discharge of $NO_x$ from the upstream side exhaust purification catalyst 20 substantially zero. Further, the cumulative time period when calculating the cumulative oxygen excess/deficiency is short, so there is little difference in calculation compared with when cumulatively adding the value over a long time period. For this reason, $NO_x$ is kept from ending up being discharged due to the error in calculation of the cumulative oxygen excess/deficiency.

Note that, the control of the air-fuel ratio correction amount AFC in the present embodiment, that is, the control of the target air-fuel ratio, is performed by the ECU 31 functioning as the controller for the internal combustion engine. Therefore, the ECU 31 can be said to be provided with an air-fuel ratio control part controlling the air-fuel ratio of the exhaust gas flowing into the upstream side exhaust purification catalyst 20. Specifically, it can be said that the air-fuel ratio control part continuously or intermittently sets the target air-fuel ratio of the exhaust gas flowing into the upstream side exhaust purification catalyst 20 to the lean air-fuel ratio when the air-fuel ratio of the exhaust gas detected by the downstream side air-fuel ratio sensor 41 becomes the rich judged air-fuel ratio or less until the oxygen storage amount OSA of the upstream side exhaust purification catalyst 20 is estimated as being the switching reference storage amount Cref or more and continuously or intermittently sets the target air-fuel ratio to the rich air-fuel ratio when it is estimated that the oxygen storage amount OSA of the upstream side exhaust purification catalyst 20 has become the switching reference storage amount Cref or more until the air-fuel ratio of the exhaust gas detected by the downstream side air-fuel ratio sensor 41 becomes the rich judged air-fuel ratio or less without the oxygen storage amount OSA reaching the maximum storable oxygen amount Cmax.

More simply stated, in the present embodiment, it can be said that the air-fuel ratio control part of the ECU 31 switches the target air-fuel ratio (that is, the air-fuel ratio of the exhaust gas flowing into the upstream side exhaust purification catalyst 20) to the lean air-fuel ratio when the air-fuel ratio detected by the downstream side air-fuel ratio sensor 41 becomes the rich judged air-fuel ratio or less and switches the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes the switching reference storage amount Cref or more.

<Sensor Temperature Control at Time of Normal Air-Fuel Ratio Control>

In this regard, the air-fuel ratio sensors 40 and 41 cannot output currents corresponding to the air-fuel ratios of the exhaust gas around the air-fuel ratio sensors 40 and 41 if the temperatures are less than the activation temperature (for example, 500° C.) Therefore, if the air-fuel ratio sensors 40 and 41 are less than the activation temperature, it is not possible to use the air-fuel ratio sensor 41 to accurately detect the air-fuel ratio of the exhaust gas around the air-fuel ratio sensor 41. For this reason, when using the air-fuel ratio sensors 40 and 41 to detect the air-fuel ratios of the exhaust gas, the temperatures of the air-fuel ratio sensors 40 and 41 have to be maintained at the activation temperature or more.

For this reason, when performing the above-mentioned normal air-fuel ratio control, the heater parts 56 heat the air-fuel ratio sensors 40 and 41, in particular, the solid electrolyte layers 51 of the air-fuel ratio sensors 40 and 41. Due to this, as shown in FIG. 5, the temperature Tup of the upstream side air-fuel ratio sensor 40 and the temperature Tdwn of the downstream side air-fuel ratio sensor 41 are also maintained at the activation temperature Tact or more. In particular, in the present embodiment, the sensors are heated to temperatures a certain degree higher than the activation temperature Tact (for example, 700° C.) or so and are maintained at those temperatures. Due to this, the air-fuel ratio sensors 40 and 41 can accurately detect the air-fuel ratios of the exhaust gas around the air-fuel ratio sensors 40 and 41.

Note that, the temperature control of the air-fuel ratio sensors 40 and 41 is performed by the ECU 31 functioning as the controller for an internal combustion engine. Therefore, the ECU 31 can be said to be provided with a heating control part controlling the heating of the upstream side air-fuel ratio sensor 40 by the heater part 56 of the upstream side air-fuel ratio sensor 40 and the heating of the downstream side air-fuel ratio sensor 41 by the heater part 56 of the downstream side air-fuel ratio sensor 41. The heating control part controls these heater parts 56 of the air-fuel ratio sensors 40 and 41 so that the temperature of the upstream side air-fuel ratio sensor 40 and the temperature of the downstream side air-fuel ratio sensor 41 both become predetermined temperatures of the activation temperature or more while the internal combustion engine is operating.

Specifically, in the present embodiment, the temperatures of the air-fuel ratio sensors 40 and 41 are, for example, calculated based on the impedance between the electrodes 52 and 53. Further, the heater parts 56 of the air-fuel ratio sensors 40 and 41 are feedback controlled so that the calculated temperatures of the air-fuel ratio sensors 40 and 41 become the target temperatures. As explained above, when performing the normal air-fuel ratio control, the target temperatures are set to temperatures certain degrees higher than the activation temperature (for example, 700° C.)

<Automatic Stop of Internal Combustion Engine>

In this regard, part of the vehicle mounting the internal combustion engine has an automatic stop function whereby the internal combustion engine is temporarily automatically stopped in the state where the ignition is ON. As one example of a mechanism by which such automatic stop is performed, an engine automatic stop/restart mechanism may be mentioned. In an engine automatic stop/restart mechanism, the internal combustion engine can be temporarily automatically made to stop when, for example, the vehicle has stopped to wait for a traffic signal to change.

Specifically, in an engine automatic stop/restart mechanism, for example, the internal combustion engine is automatically stopped when the driver steps on the brake pedal (not shown) and the speed of the vehicle mounting the internal combustion engine becomes a predetermined speed or less. On the other hand, in an engine automatic stop/restart apparatus, the internal combustion engine can be made to automatically restart if the amount of depression of the accelerator pedal by the driver becomes substantially zero. Due to this, the internal combustion engine can be made to stop in a time period during which a conventional internal combustion engine performs an idling operation and therefore the fuel economy of the internal combustion engine can be improved.

Further, as another example of the mechanism in which an automatic stop is performed, a hybrid mechanism which uses an internal combustion engine and a motor to drive a vehicle may be mentioned. In a hybrid mechanism, for example, when the vehicle is being driven at a low speed, the drive force of the motor alone may be used to drive the vehicle, while when the vehicle is being driven at a medium or high speed, the drive force of the internal combustion engine may additionally be used to drive the vehicle. Therefore, in a hybrid mechanism, the internal combustion engine can be made to automatically stop not only while the vehicle is stopped, but also when the vehicle is being driven at a low speed. In addition, if the driving speed of the vehicle becomes a certain extent of speed or more or the amount of depression of the accelerator pedal 42 becomes a certain constant amount or more, the internal combustion engine is automatically made to restart. Alternatively, the internal combustion engine is made to automatically restart when the charging capacity of the battery for driving the motor etc. becomes a certain level or less.

<Problem Points in Case of Automatic Stop>

In this regard, there is no need to perform the above-mentioned normal air-fuel ratio control while the internal combustion engine is stopped. Therefore, the outputs of the air-fuel ratio sensors 40 and 41 are not utilized for control of the internal combustion engine or vehicle while the internal combustion engine is stopped. On the other hand, at the air-fuel ratio sensors 40 and 41, using the heater parts 56 to maintain the temperatures of the air-fuel ratio sensors 40 and 41 at the activation temperature Tact or more consumes considerable electric power. In particular, while the internal combustion engine is stopped, high temperature exhaust gas does not flow around the air-fuel ratio sensors 40 and 41, so the electric power required for maintaining the temperatures of the air-fuel ratio sensors 40 and 41 at the activation temperature Tact or more increases.

For this reason, when the automatic stop function of the internal combustion engine causes the internal combustion engine to be automatically stopped, it may be considered to stop supplying power to the heater parts 56 of the air-fuel ratio sensors 40 and 41 while the internal combustion engine is stopped. Due to this, it is possible to keep down the electric power consumption at the air-fuel ratio sensors 40 and 41.

However, in this case, while the internal combustion engine is stopped, the temperatures of the air-fuel ratio sensors 40 and 41 often fall below the activation temperature Tact. If the temperatures of the air-fuel ratio sensors 40 and 41 end up falling to less than the activation temperature, a certain extent of time is taken after restart of the internal combustion engine until the temperatures of the air-fuel ratio sensors 40 and 41 rise to the activation temperature Tact or more. Further, in the time period from when the internal combustion engine is restarted until the temperatures of the air-fuel ratio sensors 40 and 41 rises to the activation temperature Tact or more, the air-fuel ratio sensors 40 and 41 cannot accurately detect the air-fuel ratio of the exhaust gas and accordingly the above-mentioned normal air-fuel ratio control cannot be performed. As a result, during this time period, the exhaust emission may deteriorate.

On the other hand, it may be considered to continue supplying power to the heater parts 56 of the air-fuel ratio sensors 40 and 41 even when the automatic stop function of the internal combustion engine causes the internal combustion engine to automatically stop. Due to this, it would become possible to maintain the temperatures of the air-fuel ratio sensors 40 and 41 at the activation temperature Tact or more even while the internal combustion engine is stopped. As a result, when the internal combustion engine is restarted, the air-fuel ratio sensors 40 and 41 would be able to be used for air-fuel ratio control right after restart, so it would be possible to suppress deterioration of the exhaust emission at the time of restart.

However, if the internal combustion engine is automatically stopped due to the automatic stop function of the internal combustion engine, the outputs of the air-fuel ratio sensors 40 and 41 are not utilized while the internal combustion engine is stopped. Despite this as well, the temperatures of the air-fuel ratio sensors 40 and 41 would be maintained at the activation temperature while the internal combustion engine were stopped, so electric power would be unnecessarily consumed in the air-fuel ratio sensors 40 and 41 and in turn deterioration of the fuel economy would be invited.

<Control in Present Embodiment>

Therefore, in the controller for the internal combustion engine of the present embodiment, the heating control part is designed to control the heater part 56 of the upstream side air-fuel ratio sensor 40 so that the temperature of the upstream side air-fuel ratio sensor 40 becomes the activation temperature or more during an automatic stop of the internal combustion engine. In addition, the heating control part is designed to control the heater part 56 of the downstream side air-fuel ratio sensor 41 so that the temperature of the downstream side air-fuel ratio sensor 41 becomes less than the activation temperature during automatic stop of the internal combustion engine. Further, the heating control part is designed to control the heater part 56 of the downstream side air-fuel ratio sensor 41 so that not only the temperature of the upstream side air-fuel ratio sensor 40, but also the downstream side air-fuel ratio sensor 41 become the activation temperature after the internal combustion engine is restarted after automatic stop.

Furthermore, in the controller for an internal combustion engine of the present embodiment, the air-fuel ratio control part controls the air-fuel ratio of the exhaust gas flowing into the upstream side exhaust purification catalyst 20 based on the output of the upstream side air-fuel ratio sensor 40 and the output of the downstream side air-fuel ratio sensor 41 during engine operation as explained above. In addition, the air-fuel ratio control part is designed to control the air-fuel ratio of the exhaust gas flowing into the upstream side exhaust purification catalyst 20 based on the output of the upstream side air-fuel ratio sensor 40 without utilizing the output of the downstream side air-fuel ratio sensor 41 even during engine operation temporarily from the point of time of restart when the internal combustion engine is restarted after the automatic stop. Further, air-fuel ratio control part is designed to control the air-fuel ratio of the exhaust gas flowing into the upstream side exhaust purification catalyst 20 based on the output of the upstream side air-fuel ratio sensor 40 and the output of the downstream side air-fuel ratio sensor 41 from when the temperature of the downstream side air-fuel ratio sensor 41 becomes the activation temperature or more when the internal combustion engine is restarted after automatic stop.

Figure 6:
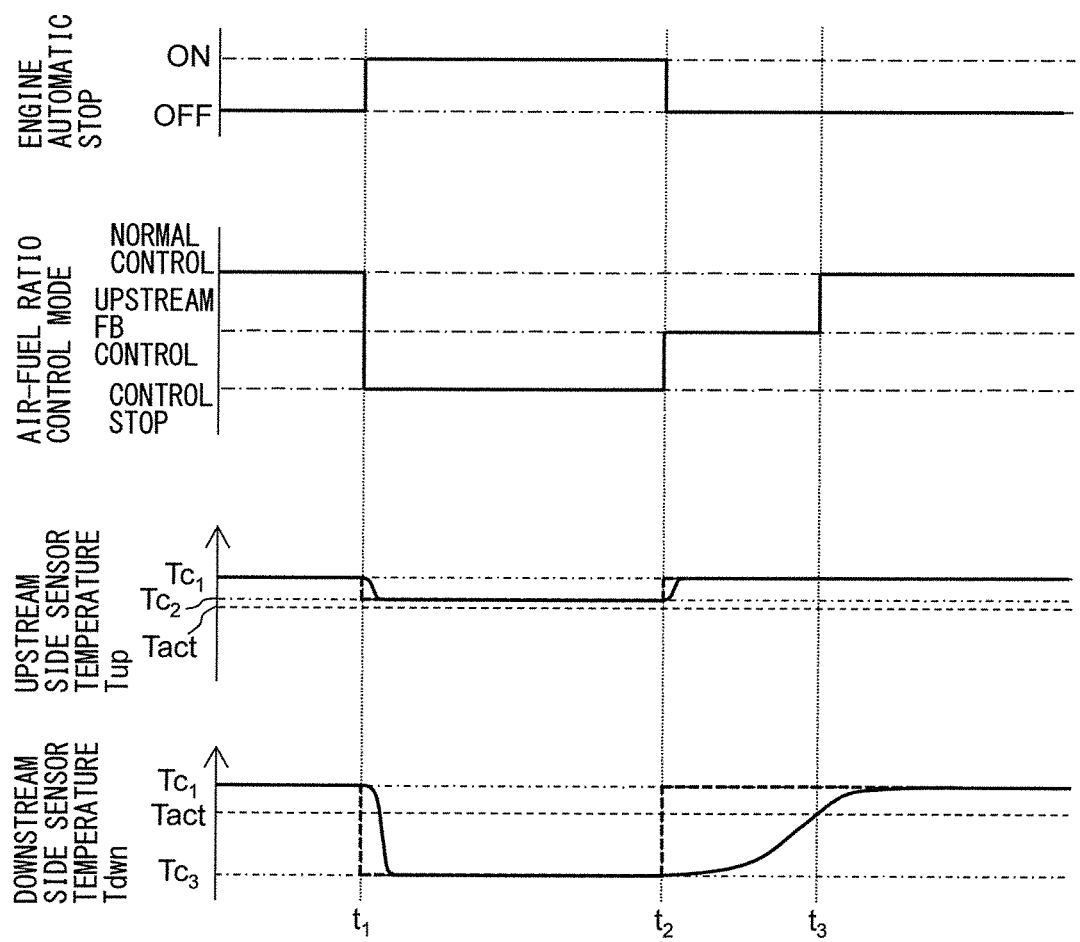
FIG. 6 is a time chart showing operation of an automatic stop mechanism of an internal combustion engine and changes in an air-fuel ratio control mode etc.
Figure 7:
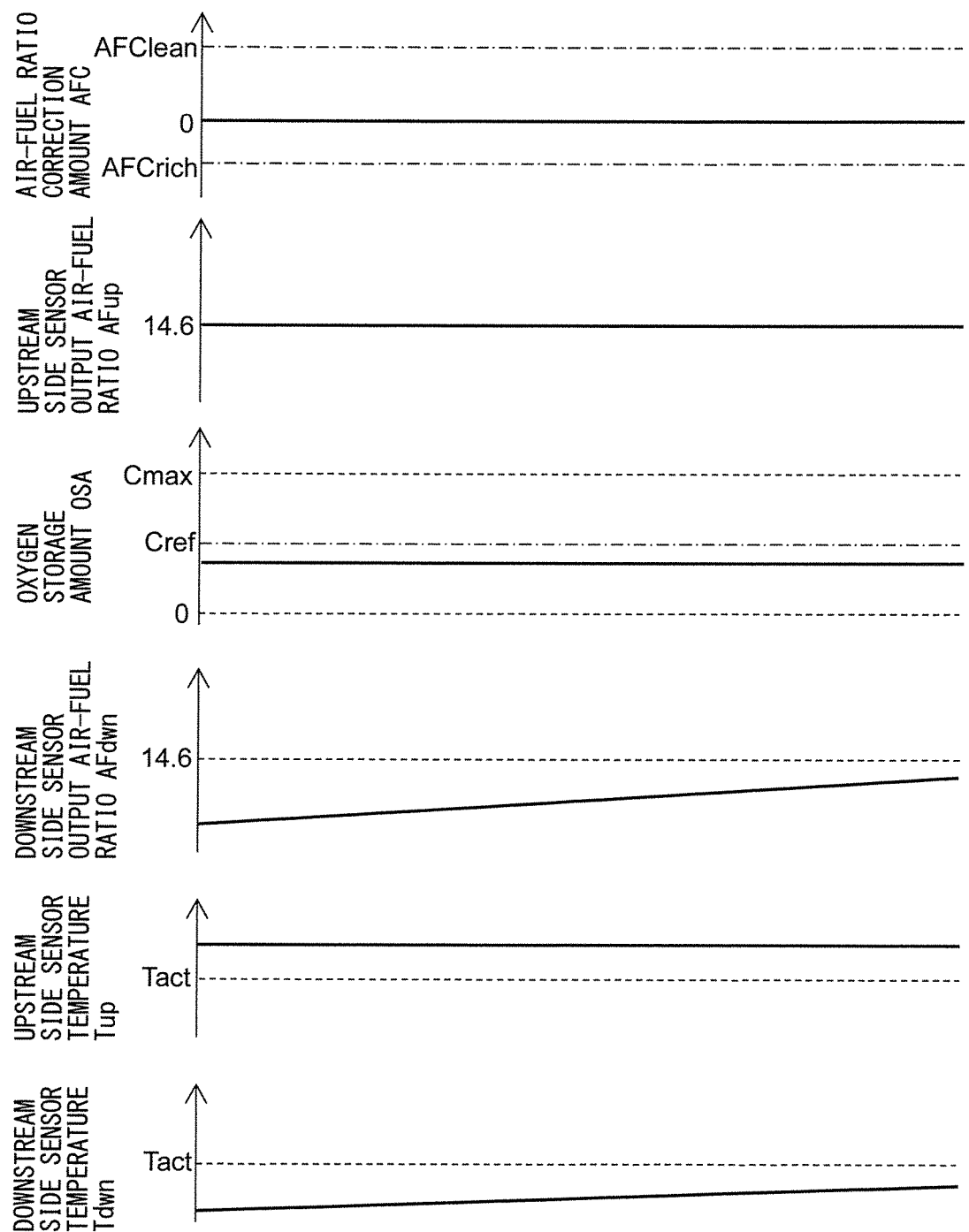
FIG. 7 is a time chart showing the air-fuel ratio correction amount etc. in part of the time period of FIG. 6 where upstream FB air-fuel ratio control is being performed.

FIG. 6 is a time chart of the operation of the automatic stop mechanism of an internal combustion engine, the air-fuel ratio control mode, the temperature Tup of the upstream side air-fuel ratio sensor 40, and the temperature Tdwn of the downstream side air-fuel ratio sensor 41. In the figure, the broken line at the temperature Tup of the upstream side air-fuel ratio sensor 40 shows the target temperature of the upstream side air-fuel ratio sensor 40, while the broken line at the temperature Tdwn of the downstream side air-fuel ratio sensor 41 shows the target temperature of the downstream side air-fuel ratio sensor 41. Further, in the air-fuel ratio control mode, "normal control" is a control mode where the normal air-fuel ratio control explained above referring to FIG. 5 is performed. Further, in the air-fuel ratio control mode, "upstream FB control" is a control mode where the upstream FB air-fuel ratio control explained later referring to FIG. 7 is performed. In addition, in the air-fuel ratio control mode, "control stop" is a control mode where air-fuel ratio control is not performed.

In the example shown in FIG. 6, before the time $t_1$, the internal combustion engine is not made to automatically stop by the automatic stop function but is operating. At this time, the air-fuel ratio control mode becomes the normal control mode. Accordingly, the normal air-fuel ratio control explained with reference to FIG. 5 will be explained. Therefore, feedback control is performed based on the output air-fuel ratio AFup of the upstream side air-fuel ratio sensor 40 so that the output air-fuel ratio AFup becomes the target air-fuel ratio. In addition, the target air-fuel ratio is set based on the output air-fuel ratio AFdwn of the downstream side air-fuel ratio sensor 41. Specifically, when the output air-fuel ratio AFdwn of the downstream side air-fuel ratio sensor 41 becomes the rich judged air-fuel ratio AFrich or less, the air-fuel ratio correction amount AFC is switched from the rich set correction amount AFCrich to the lean set correction amount AFClean.

Further, before the time $t_1$, the target temperature of the upstream side air-fuel ratio sensor 40 and the target temperature of the downstream side air-fuel ratio sensor 41 are set to a high first temperature (for example, 700° C.) $Tc_1$ of the activation temperature (for example, 500° C.) or more. Due to this, the heater parts 56 of the air-fuel ratio sensors 40 and 41 are controlled so that the temperatures of the air-fuel ratio sensors 40 and 41 become the first temperature $Tc_1$. In the illustrated example, before the time $t_1$, the temperatures of the air-fuel ratio sensors 40 and 41 are maintained at the first temperature $Tc_1$.

In the example shown in FIG. 6, at the time $t_1$, the internal combustion engine is made to automatically stop by the automatic stop function. Due to this, fuel is no longer fed from a fuel injector 11. For this reason, the air-fuel ratio control mode is switched from the normal control mode to the control stop mode. As a result, control for determining the amount of fuel fed from the fuel injector 11, that is, air-fuel ratio control, is no longer performed.

Further, in the present embodiment, at the time $t_1$, if the internal combustion engine is made to automatically stop by the automatic stop function, the target temperature of the upstream side air-fuel ratio sensor 40 is made to fall to the second temperature (for example, 600° C.) $Tc_2$. However, the target temperature of the upstream side air-fuel ratio sensor 40 is made the temperature of the activation temperature Tact or more. At the time $t_1$ on, the heater part 56 of the upstream side air-fuel ratio sensor 40 is controlled so that the temperature Tup of the upstream side air-fuel ratio sensor 40 becomes the second temperature $Tc_2$.

On the other hand, at the time $t_1$, the target temperature of the downstream side air-fuel ratio sensor 41 is also made to fall. The target temperature of the downstream side air-fuel ratio sensor 41 is made to decrease to a third temperature less than the activation temperature Tact (for example, 200° C.). Therefore, at the time $t_1$ on, the heater part 56 of the downstream side air-fuel ratio sensor 41 is controlled so that the temperature Tdwn of the downstream side air-fuel ratio sensor 41 becomes the third temperature $Tc_3$. In particular, in the present embodiment, the third temperature $Tc_3$ is made a temperature which the temperature Tdwn of the downstream side air-fuel ratio sensor 41 will not reach over a certain extent of time even if stopping the supply of power to the heater part 56 of the downstream side air-fuel ratio sensor 41. As a result, in the present embodiment, at the time $t_1$ on, the supply of power to the heater part 56 of the downstream side air-fuel ratio sensor 41 is made to stop.

Note that, in the example shown in FIG. 6, while the internal combustion engine is automatically stopped by the automatic stop function, the target temperature of the downstream side air-fuel ratio sensor 41 need not be set to the third temperature $Tc_3$. It is also possible to just stop the supply of power to the downstream side air-fuel ratio sensor 41. Even if stopping the supply of power in this way, the temperature of the downstream side air-fuel ratio sensor 41 can be made less than the activation temperature Tact.

After that, in the example shown in FIG. 6, at the time $t_2$, the automatic stop by the automatic stop mechanism is made to end. Therefore, at the time t2, the internal combustion engine is made to restart. Further, at the time $t_2$, the target temperature of the upstream side air-fuel ratio sensor 40 and the target temperature of the downstream side air-fuel ratio sensor 41 are both switched to the first temperature $Tc_1$.

Here, at the time $t_2$, the temperature of the upstream side air-fuel ratio sensor 40 becomes the second temperature $Tc_2$ of the activation temperature Tact or more. In addition, the temperature of the downstream side air-fuel ratio sensor 41 becomes a third temperature $Tc_3$ less than the activation temperature Tact. Therefore, at the point of time of the time $t_2$, the output of the upstream side air-fuel ratio sensor 40 accurately expresses the exhaust air-fuel ratio, but the output of the downstream side air-fuel ratio sensor 41 might not express the exhaust air-fuel ratio.

Further, at the time $t_2$, the target temperatures of the air-fuel ratio sensors 40 and 41 are switched to the first temperature $Tc_1$, so the heater parts 56 of these air-fuel ratio sensors 40 and 41 are used for heating. However, a certain extent of time is taken to make the temperature of the downstream side air-fuel ratio sensor 41 rise to the activation temperature Tact or more by heating by the heater part 56. Therefore, for a certain extent of time from time $t_2$, the output air-fuel ratio of the downstream side air-fuel ratio sensor 41 cannot be used for air-fuel ratio control.

Therefore, in the present embodiment, if, at the time $t_2$, the internal combustion engine is made to restart, not the above-mentioned normal air-fuel ratio control, but the later explained upstream FB air-fuel ratio control is performed. In the upstream FB air-fuel ratio control, as explained later, the air-fuel ratio of the exhaust gas flowing into the upstream side exhaust purification catalyst 20 is controlled based on the output of the upstream side air-fuel ratio sensor 40 without using the output of the downstream side air-fuel ratio sensor 41.

After that, in the example shown in FIG. 6, at the time $t_3$, the temperature of the downstream side air-fuel ratio sensor 41 rises to the activation temperature Tact or more. Therefore, at the time $t_3$ on, the output of the downstream side air-fuel ratio sensor 41 accurately expresses the exhaust air-fuel ratio. For this reason, in the present embodiment, if the internal combustion engine is restarted after automatic stop, the above-mentioned normal air-fuel ratio control is performed at the time $t_3$ when the temperature Tdwn of the downstream side air-fuel ratio sensor 41 becomes the activation temperature Tact or more and the subsequent time. As explained above, in normal air-fuel ratio control, the air-fuel ratio of the exhaust gas flowing into the upstream side exhaust purification catalyst 20 is controlled based on the output of the upstream side air-fuel ratio sensor 40 and the output of the downstream side air-fuel ratio sensor 41.

<Upstream FB Air-Fuel Ratio Control>

Next, referring to FIG. 7, the upstream FB air-fuel ratio control performed at the times $t_2$ to $t_3$ of FIG. 6 will be explained. FIG. 7 is a time chart of the air-fuel ratio correction amount AFC etc. in part of the time period of the times $t_2$ to $t_3$ of FIG. 6 when the upstream FB air-fuel ratio control is being performed.

As shown in FIG. 7, when upstream FB air-fuel ratio control is being performed, the air-fuel ratio correction amount AFC is maintained at zero. Therefore, the target air-fuel ratio is maintained at the stoichiometric air-fuel ratio. For this reason, in upstream FB air-fuel ratio control, feedback control is performed so that the output air-fuel ratio of the upstream side air-fuel ratio sensor 40 is made to become the stoichiometric air-fuel ratio.

Further, in the above-mentioned normal air-fuel ratio control, the target air-fuel ratio is controlled based on the output air-fuel ratio of the downstream side air-fuel ratio sensor 41. However, in the upstream FB air-fuel ratio control, the target air-fuel ratio is maintained at the stoichiometric air-fuel ratio, so in setting the target air-fuel ratio, the output air-fuel ratio of the downstream side air-fuel ratio sensor 41 is not used. As a result, in upstream FB air-fuel ratio control, the output air-fuel ratio of the downstream side air-fuel ratio sensor 41 is not used. In particular, in upstream FB air-fuel ratio control, control is performed just based on the output air-fuel ratio of the upstream side air-fuel ratio sensor 40.

By performing such upstream FB air-fuel ratio control, the air-fuel ratio of the exhaust gas discharged from the engine body is maintained at substantially the stoichiometric air-fuel ratio. For this reason, during performance of upstream FB air-fuel ratio control, the output air-fuel ratio AFup of the upstream side air-fuel ratio sensor 40 is maintained at substantially the stoichiometric air-fuel ratio. Further, along with this, the oxygen storage amount OSA of the upstream side exhaust purification catalyst 20 is maintained constant.

In this way, the air-fuel ratio of the exhaust gas flowing into the upstream side exhaust purification catalyst 20 becomes substantially the stoichiometric air-fuel ratio, so the air-fuel ratio of the exhaust gas flowing out from the upstream side exhaust purification catalyst 20 is also maintained at substantially the stoichiometric air-fuel ratio. Therefore, the output air-fuel ratio of the downstream side air-fuel ratio sensor 41 should become substantially the stoichiometric air-fuel ratio. However, in the example shown in FIG. 7, the temperature Tdwn of the downstream side air-fuel ratio sensor 41 is less than the activation temperature Tact, so the output air-fuel ratio AFdwn of the downstream side air-fuel ratio sensor 41 becomes an air-fuel ratio different from the actual air-fuel ratio. In the illustrated example, the output air-fuel ratio AFdwn is an air-fuel ratio lower than the stoichiometric air-fuel ratio. Further, in the example shown in FIG. 7, the temperature of the downstream side air-fuel ratio sensor 41 gradually approaches the activation temperature Tact. Along with this, the output air-fuel ratio AFdwn of the downstream side air-fuel ratio sensor 41 also changes toward the stoichiometric air-fuel ratio.

<Effect of Control in Present Embodiment Etc.>

As explained above, according to the present embodiment, the temperature of the downstream side air-fuel ratio sensor 41 is lowered to less than the activation temperature Tact during automatic stop of the internal combustion engine. For this reason, electric power is kept from being consumed for maintain the temperature Tdwn of the downstream side air-fuel ratio sensor 41 at the activation temperature Tact or more during automatic stop of the internal combustion engine. As a result, according to the present embodiment, it is possible to improve the fuel economy of the internal combustion engine.

Further, according to the present embodiment, right after restarting the internal combustion engine after automatic stop, feedback control (upstream FB air-fuel ratio control) is performed based on the output of the upstream side air-fuel ratio sensor 40 without using the output of the downstream side air-fuel ratio sensor 41. Even if using performing feedback control only based on the output of the upstream side air-fuel ratio sensor 40 in this way, if a short time period, it is possible to maintain the exhaust emission without allowing almost any unburned gas or $NO_x$ to flow out from the upstream side exhaust purification catalyst 20. Therefore, even right after making the internal combustion engine restart after automatic stop, the exhaust emission does not deteriorate much at all. Therefore, according to the present embodiment, it is possible to keep the power consumption by the heater parts 56 at the heater parts 56 of the air-fuel ratio sensors 40 and 41 small and suppress deterioration of the exhaust emission right after engine restart.

Further, in the present embodiment, if, at the time $t_3$ shown in FIG. 6, the temperature Tdwn of the downstream side air-fuel ratio sensor 41 becomes the activation temperature Tact or more, the upstream FB air-fuel ratio control is switched to normal air-fuel ratio control. Therefore, it is possible to keep the time period during which upstream FB air-fuel ratio control is performed short.

Here, even if the output air-fuel ratio of the upstream side air-fuel ratio sensor 40 deviates from the actual air-fuel ratio, if continuing the upstream FB air-fuel ratio control for a long period of time, the oxygen storage amount OSA of the upstream side exhaust purification catalyst 20 reaches zero or the maximum storable oxygen amount. Therefore, in this case, unburned gas or $NO_x$ ends up flowing out from the upstream side exhaust purification catalyst 20. However, when not using a downstream side air-fuel ratio sensor 41, it is not possible to detect the outflow of such unburned gas or $NO_x$ from the upstream side exhaust purification catalyst 20. A large amount of unburned gas or $NO_x$ may flow out from the upstream side exhaust purification catalyst 20. As opposed to this, in the present embodiment, it is possible to keep the time period during which upstream FB air-fuel ratio control is performed short, so it is possible to keep unburned gas or $NO_x$ ending up flowing out in large amounts from the upstream side exhaust purification catalyst 20.

In addition, in the present embodiment, during an automatic stop of the internal combustion engine, the temperature of the upstream side air-fuel ratio sensor 40 is made to fall compared with during operation of the internal combustion engine. Below, the reason for setting the temperature of the upstream side air-fuel ratio sensor 40 in this way will be explained.

Figure 8:
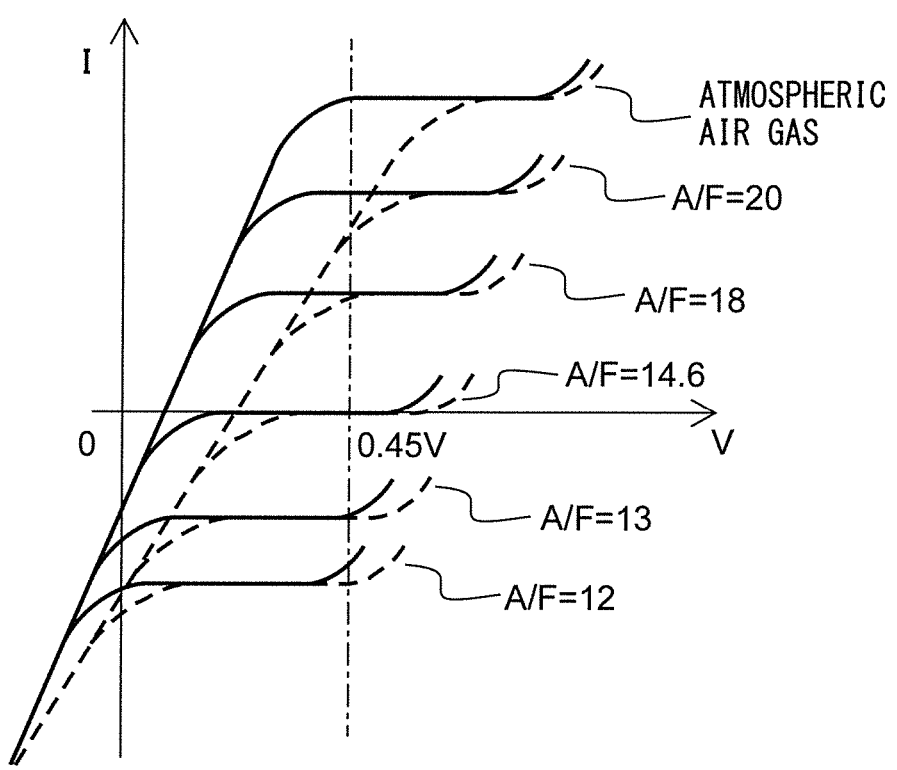
FIG. 8 is a view showing the relationship of the applied voltage V and output current I at different exhaust air-fuel ratios A/F.

FIG. 8 is a view showing the voltage-current (V-I) characteristic of the air-fuel ratio sensors 40 and 41 similar to FIG. 3. In FIG. 8, the solid line shows the case where the temperatures of the air-fuel ratio sensors 40 and 41 are high (for example, 700° C.), while the broken line shows the case where the temperatures of the air-fuel ratio sensors 40 and 41 are lower than the activation temperature or more (for example, 600° C.).

As shown by the one-dot chain line in FIG. 8, consider the case when making the applied voltage to the air-fuel ratio sensors 40 and 41 0.45V. In this case, if the temperatures of the air-fuel ratio sensors 40 and 41 are high, the one-dot chain line showing 0.4V of FIG. 8 crosses the limit current region at various air-fuel ratios. Therefore, if the temperatures of the air-fuel ratio sensors 40 and 41 are high, the air-fuel ratio can be detected in a broad range of air-fuel ratios. On the other hand, if the temperatures of the air-fuel ratio sensors 40 and 41 are low, the one-dot chain line showing 0.45V of FIG. 8 crosses the limit current region only when the exhaust air-fuel ratio is near the stoichiometric air-fuel ratio. Therefore, if the temperatures of the air-fuel ratio sensors 40 and 41 are low, it is only possible to detect the exhaust air-fuel ratio in a narrow range.

In addition, the higher the temperatures of the air-fuel ratio sensors 40 and 41, the faster the speed of movement of the oxygen ions in the solid electrolyte layer 51. For this reason, the speeds of response at the air-fuel ratio sensors 40 and 41 become faster.

Here, if just performing the above-mentioned normal air-fuel ratio control or upstream FB air-fuel ratio control, the ranges of detection of the air-fuel ratio sensors 40 and 41 need not be that broad. Further, the response speeds at the air-fuel ratio sensors 40 and 41 need not be fast. However, when diagnosing the air-fuel ratio sensors 40 and 41 for abnormality, it is required that the ranges of detection of the air-fuel ratio sensors 40 and 41 be broad and that the response speeds be fast. In particular, when diagnosing the air-fuel ratio sensors 40 and 41 for abnormality, the limit current has to be generated even if atmospheric gas flows around the air-fuel ratio sensors 40 and 41. Therefore, during normal air-fuel ratio control or upstream FB air-fuel ratio control where the upstream side air-fuel ratio sensor 40 can be diagnosed for abnormality, the temperature of the upstream side air-fuel ratio sensor 40 is made a limit temperature (for example, 700° C.) by which a limit current can be generated even if atmospheric gas flows around it or is made more.

On the other hand, the air-fuel ratio sensors 40 and 41 are not diagnosed for abnormality while the internal combustion engine is stopped. Therefore, while the internal combustion engine is stopped, the temperatures of the air-fuel ratio sensors 40 and 41 do not have to be maintained high. For this reason, in the present embodiment, the temperature of the upstream side air-fuel ratio sensor 40 is decreased while the internal combustion engine is automatically stopped compared with while the internal combustion engine is operating. Specifically, the temperature of the upstream side air-fuel ratio sensor 40 is lowered to a temperature less than the above-mentioned limit temperature and of the activation temperature or more. Due to this, it is possible to keep down the power consumption at the heater part 56 of the upstream side air-fuel ratio sensor 40.

Note that, in the above embodiment, at the time $t_3$, the upstream FB air-fuel ratio control is switched to normal air-fuel ratio control when the temperature Tdwn of the downstream side air-fuel ratio sensor 41 becomes the activation temperature or more. However, the upstream FB air-fuel ratio control may be switched to normal air-fuel ratio control at any timing so long as after the temperature Tdwn of the downstream side air-fuel ratio sensor 41 becomes the activation temperature or more or the temperature Tdwn of the downstream side air-fuel ratio sensor 41 is expected to become the activation temperature or more. Therefore, for example, it may also be switched when a sufficient time period has elapsed for the temperature of the downstream side air-fuel ratio sensor 41 to become the activation temperature or more after starting the supply of power to the heater part 56 of the downstream side air-fuel ratio sensor 41.

<Specific Explanation of Control>

Figure 9:
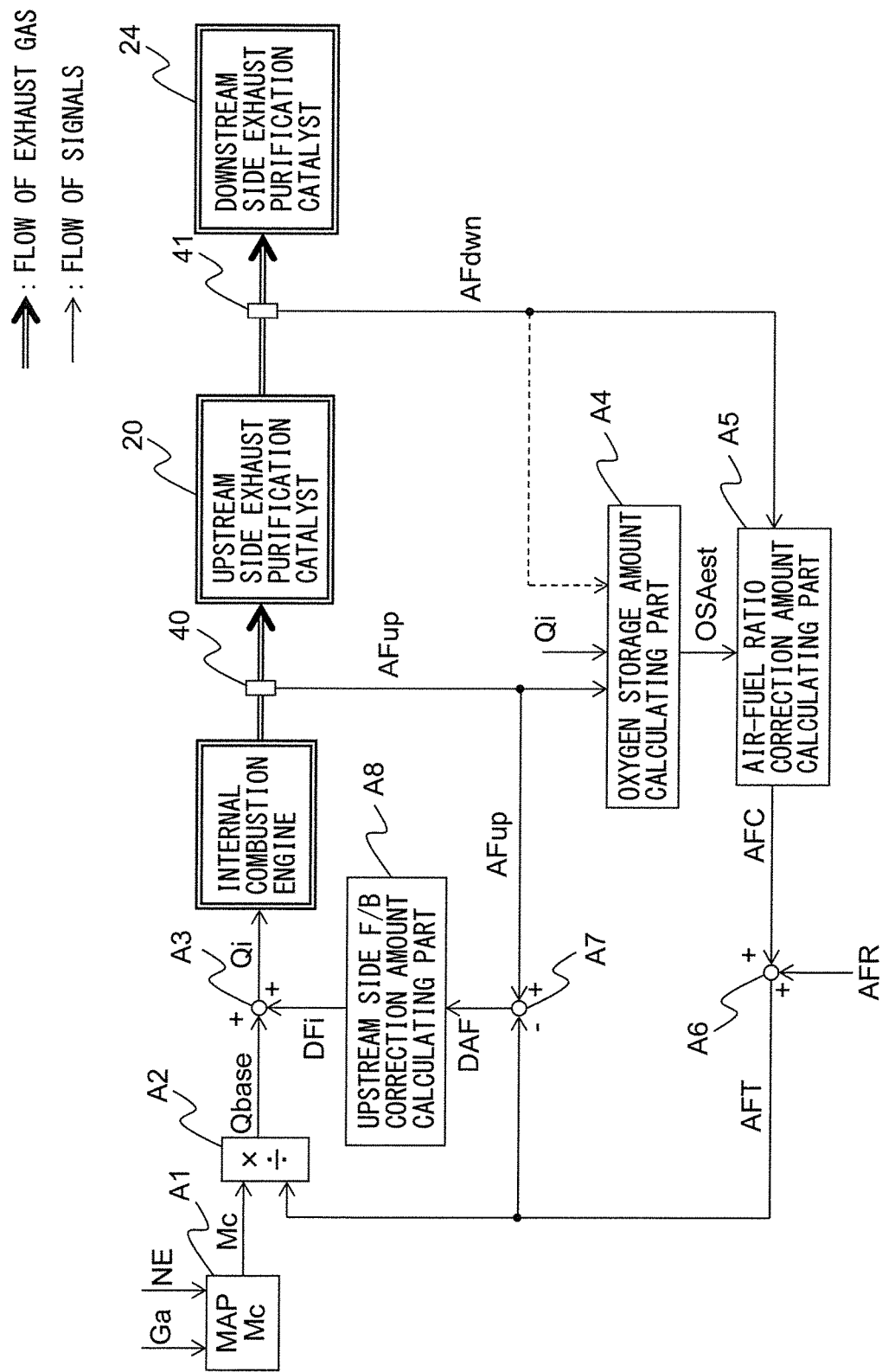
FIG. 9 is a functional block diagram of a controller for an internal combustion engine.
Figure 10:
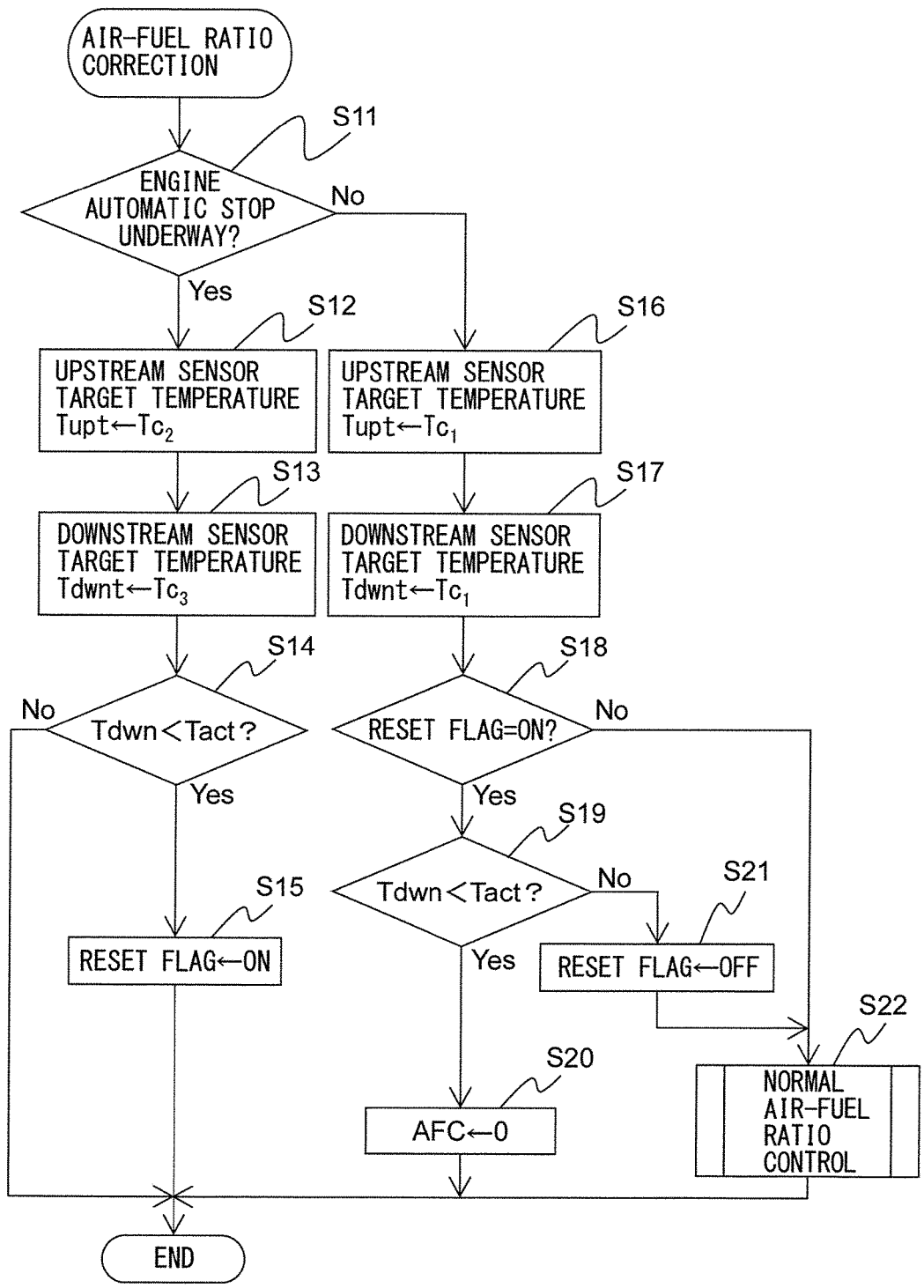
FIG. 10 is a flow chart showing a control routine of air-fuel ratio control.
Figure 11:
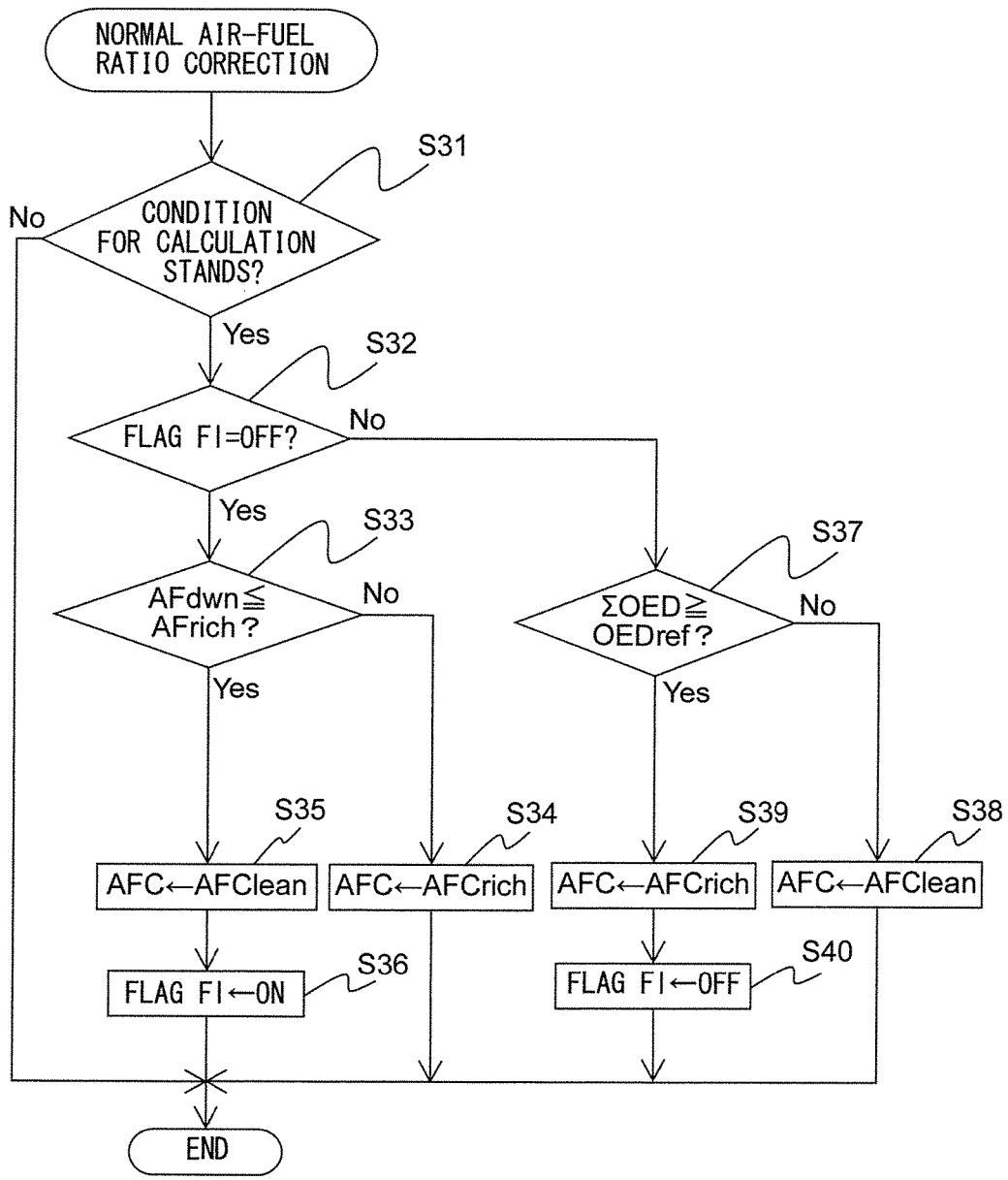
FIG. 11 is a flow chart showing a control routine of normal air-fuel ratio control.

Next, referring to FIG. 9 to FIG. 11, a controller in the above embodiment will be specifically explained. The controller in the present embodiment is configured including the functional blocks A1 to A8 as shown in the functional block diagram of FIG. 9. Below, while referring to FIG. 9, the different functional blocks will be explained. The operations of these functional blocks A1 to A8 are basically performed by the ECU 31.

<Calculation of Fuel Injection Amount>

First, the calculation of the fuel injection amount will be explained. In calculation of the fuel injection amount, the cylinder intake air amount calculating part A1, basic fuel injection amount calculating part A2, and fuel injection amount calculating part A3 are used.

The cylinder intake air amount calculating part A1 calculates the amount of intake air Mc to the individual cylinders based on the intake air flow rate Ga, engine speed NE, and map or calculation formula stored in the ROM 34 of the ECU 31. The intake air flow rate Ga is measured by the air flow meter 39, while the engine speed NE is calculated based on the output of the crank angle sensor 44.

The basic fuel injection amount calculating part A2 divides the cylinder intake air amount Mc calculated by the cylinder intake air amount calculating part A1 by the target air-fuel ratio AFT to calculate the basic fuel injection amount Qbase (Qbase=Mc/AFT). The target air-fuel ratio AFT is calculated by the later explained target air-fuel ratio setting means A6.

The fuel injection amount calculating part A3 adds to the basic fuel injection amount Qbase calculated by the basic fuel injection amount calculating part A2 the later explained F/B correction amount DFi to calculate the fuel injection amount Qi (Qi=Qbase+DFi). The thus calculated fuel injection amount Qi of fuel is injected from a fuel injector 11 by an injection instruction being given to the fuel injector 11.

<Calculation of Target Air-Fuel Ratio>

Next, calculation of the target air-fuel ratio will be explained. In calculating the target air-fuel ratio, an oxygen storage amount calculating part A4, air-fuel ratio correction amount calculating part A5, and target air-fuel ratio setting part A6 are used.

The oxygen storage amount calculating part A4 calculates the cumulative oxygen excess/deficiency based on the fuel injection amount Qi calculated by the fuel injection amount calculating part A3 and the output air-fuel ratio AFup of the upstream side air-fuel ratio sensor 40. Further, the oxygen storage amount is calculated based on the calculated cumulative oxygen excess/deficiency. The oxygen storage calculating means A4, for example, multiplies the difference between the output air-fuel ratio of the upstream side air-fuel ratio sensor 40 and control center air-fuel ratio with the fuel injection amount Qi and cumulatively adds the found values to calculate the cumulative oxygen excess/deficiency.

The air-fuel ratio correction amount calculating part A5 calculates the air-fuel ratio correction amount AFC of the target air-fuel ratio based on the cumulative oxygen excess/deficiency calculated by the oxygen storage amount calculating part A4 and the output air-fuel ratio AFdwn of the downstream side air-fuel ratio sensor 41. Specifically, the air-fuel ratio correction amount AFC is calculated based on the flow charts shown in FIG. 10 and FIG. 11.

The target air-fuel ratio setting part A6 adds to the control center air-fuel ratio (in the present embodiment, the stoichiometric air-fuel ratio) AFR the air-fuel ratio correction amount AFC calculated by the air-fuel ratio correction amount calculating part A5 to calculate the target air-fuel ratio AFT. The thus calculated target air-fuel ratio AFT is input to the basic fuel injection amount calculating part A2 and later explained air-fuel ratio difference calculating means A7.

<Calculation of F/B Correction Amount>

Next, the calculation of the F/B correction amount based on the output air-fuel ratio AFup of the upstream side air-fuel ratio sensor 40 will be explained. In calculation of the F/B correction amount, the air-fuel ratio difference calculating part A7 and F/B correction amount calculating part A8 are used.

The air-fuel ratio difference calculating part A7 subtracts from the output air-fuel ratio AFup of the upstream side air-fuel ratio sensor 40 the target air-fuel ratio AFT calculated by the target air-fuel ratio setting part A6 to thereby calculate the air-fuel ratio difference DAF (DAF=AFup−AFT). This air-fuel ratio difference DAF is a value expressing the excess/deficiency of the amount of fuel fed with respect to the target air-fuel ratio AFT.

The F/B correction amount calculating part A8 processes the air-fuel ratio difference DAF calculated by the air-fuel ratio difference calculating part A7 by proportional-integral-differential (PID) processing to calculate the F/B correction amount DFi for compensating for the excess/deficiency of the amount of feed of fuel based on the following formula (2). The thus calculated F/B correction amount DFi is input to the fuel injection amount calculating part A3.

$$DFi = Kp \cdot DAF + Ki \cdot SDAF + Kd \cdot DDAF \quad (2)$$

Note that, in the above formula (2), Kp is a preset proportional gain (proportional constant), Ki is a preset integral gain (integral constant), and Kd is a preset differential gain (differential constant). Further, DDAF is the time differential of the air-fuel ratio difference DAF and is calculated by dividing the difference between the currently updated air-fuel ratio difference DAF and the previously updated air-fuel ratio difference DAF by the time corresponding to the updating interval. Further, SDAF is the time differential of the air-fuel ratio difference DAF. This time differential SDAF is calculated by adding the previously updated time differential DDAF and the currently updated air-fuel ratio difference DAF (SDAF=DDAF+DAF).

<Flow Chart of Air-Fuel Ratio Control>

FIG. 10 is a flow chart showing a control routine of air-fuel ratio control. The illustrated control routine is started after the ignition of the internal combustion engine is turned ON and either of the upstream side air-fuel ratio sensor 40 and downstream side air-fuel ratio sensor 41 reaches the activation temperature and is performed by interruption at certain time intervals.

As shown in FIG. 10, first, at step S11, it is judged if the internal combustion engine is being automatically stopped by the automatic stop function. When the internal combustion engine is being automatically stopped, the routine proceeds to step S12. At step S12, the target temperature Tupt of the upstream side air-fuel ratio sensor 40 is set to the above-mentioned the second temperature $Tc_2$ ($Tc_2$>Tact). As a result, the heating control part controls the heater part 56 of the upstream side air-fuel ratio sensor 40 so that the temperature of the upstream side air-fuel ratio sensor 40 becomes the second temperature $Tc_2$. Next, at step S13, the target temperature Tdwnt of the downstream side air-fuel ratio sensor 41 is set to the above-mentioned third temperature $Tc_3$ ($Tc_3$<$Tc_2$, $Tc_3$<Tact). As a result, the heating control part controls the heater part 56 of the downstream side air-fuel ratio sensor 41 so that the temperature of the downstream side air-fuel ratio sensor 41 becomes the third temperature $Tc_3$.

Next, at step S14, it is judged if the temperature Tdwn of the downstream side air-fuel ratio sensor 41 is less than the activation temperature Tact. When it is judged that the temperature Tdwn is the activation temperature Tact or more, the control routine is made to end. On the other hand, when at step S14 it is judged that the temperature Tdwn of the downstream side air-fuel ratio sensor 41 is less than the activation temperature, the routine proceeds to step S15. At step S15, the reset flag is set ON. The reset flag is a flag which is set ON after the automatic stop of the internal combustion engine while the temperature of the downstream side air-fuel ratio sensor 41 is less than the activation temperature Tact and is set OFF otherwise. Note that, the reset flag is set OFF in the initial state.

After that, if the internal combustion engine is restarted, at the next control routine, at step S11, it is judged that the internal combustion engine is not in the middle of an automatic stop and the routine proceeds to step S16. At step S16, the target temperature Tupt of the upstream side air-fuel ratio sensor 40 is set to the above-mentioned first temperature $Tc_1$ ($Tc_1$>$Tc_2$). Next, at step S17, the target temperature Tdwnt of the downstream side air-fuel ratio sensor 41 is set to the above-mentioned first temperature $Tc_1$. As a result, the heating control part controls the heater parts 56 of the upstream side air-fuel ratio sensor 40 and downstream side air-fuel ratio sensor 41 so that the temperatures of the air-fuel ratio sensors become the first temperature $Tc_1$. Next, at step S18, it is judged if the reset flag has been set ON. When it is judged that the reset flag is set ON, the routine proceeds to step S19.

At step S19, it is judged if the temperature Tdwn of the downstream side air-fuel ratio sensor 41 is the activation temperature Tact or more. If, at step S19, it is judged that the temperature Tdwn of the downstream side air-fuel ratio sensor 41 is less than the activation temperature Tact, the routine proceeds to step S20. In this case, the output of the downstream side air-fuel ratio sensor 41 cannot be utilized, so the above-mentioned upstream FB air-fuel ratio control is performed. For this reason, at step S20, the air-fuel ratio correction amount AFC is set to "0". As a result, the air-fuel ratio correction amount AFC using the output air-fuel ratio of the downstream side air-fuel ratio sensor 41 is not set. Only feedback control using the output air-fuel ratio of the upstream side air-fuel ratio sensor 40 (control using air-fuel ratio error calculating part A7 and F/B correction amount calculating part A8 of FIG. 9) is performed.

After that, if the temperature Tdwn of the downstream side air-fuel ratio sensor 41 rises and becomes the activation temperature Tact or more, at the next control routine, the routine proceeds from step S19 to step S21. At step S21, the reset flag is reset OFF and the routine proceeds to step S22. At step S22, the normal air-fuel ratio control shown in FIG. 11 is performed, and the control routine is made to end. At the next control routine, the reset flag is set OFF, so the routine proceeds from step S18 to step S22 where the normal air-fuel ratio control is continued.

<Flow Chart of Normal Air-Fuel Ratio Control>

FIG. 11 is a flow chart showing a control routine of the normal air-fuel ratio control. The illustrated control routine is performed every time step S21 of FIG. 10 is executed.

As shown in FIG. 11, first, at step S31, it is judged if the condition for calculation of the air-fuel ratio correction amount AFC stands. The case where the condition for calculation of the air-fuel ratio correction amount AFC stands is, for example, when special control such as fuel cut control is not underway. When, at step S31, it is judged that the condition for calculation of the target air-fuel ratio stands, the routine proceeds to step S32.

At step S32, it is judged if the lean set flag Fl is set OFF. The lean set flag Fl is set ON if the air-fuel ratio correction amount AFC is set to the lean set correction amount AFClean and is set OFF otherwise. When, at step S32, the lean set flag Fl is set OFF, the routine proceeds to step S33. At step S33, it is judged if the output air-fuel ratio AFdwn of the downstream side air-fuel ratio sensor 41 is the rich judged air-fuel ratio AFrich or less. When it is judged that the output air-fuel ratio AFdwn of the downstream side air-fuel ratio sensor 41 is larger than the rich judged air-fuel ratio AFrich, the routine proceeds to step S34. At step S34, the air-fuel ratio correction amount AFC is maintained as set to the rich set correction amount AFCrich and the control routine is made to end.

On the other hand, if the oxygen storage amount OSA of the upstream side exhaust purification catalyst 20 decreases and the air-fuel ratio of the exhaust gas flowing out from the upstream side exhaust purification catalyst 20 falls, at step S33, it is judged if the output air-fuel ratio AFdwn of the downstream side air-fuel ratio sensor 41 is the rich judged air-fuel ratio AFrich or less. In this case, the routine proceeds to step S35 where the air-fuel ratio correction amount AFC is switched to the lean set correction amount AFClean. Next, at step S36, the lean set flag Fl is set ON and the control routine is made to end.

When the lean set flag Fl is set ON, at the next control routine, at step S32, it is judged if the lean set flag Fl is set OFF and the routine proceeds to step S37. At step S37, it is judged if the cumulative oxygen excess/deficiency ΣOED from when the air-fuel ratio correction amount AFC is switched to the lean set correction amount AFClean is smaller than the switching reference value OEDref (corresponding to switching reference storage amount Cref). When it is judged that the cumulative oxygen excess/deficiency ΣOED is smaller than the switching reference value OEDref, the routine proceeds to step S38 where the air-fuel ratio correction amount AFC continues to be set to the lean set correction amount AFClean and the control routine is made to end. On the other hand, if the oxygen storage amount of the upstream side exhaust purification catalyst 20 increases, finally, at step S37, it is judged that the cumulative oxygen excess/deficiency ΣOED is the switching reference value OEDref or more and the routine proceeds to step S39. At step S39, the air-fuel ratio correction amount AFC is switched to the rich set correction amount AFCrich. Next, at step S40, the lean set flag Fl is reset OFF and the control routine is made to end.

<Other Embodiments>

Note that, in the normal air-fuel ratio control of the above embodiment, the target air-fuel ratio is switched to the lean air-fuel ratio when the output air-fuel ratio AFdwn of the downstream side air-fuel ratio sensor 41 becomes the rich judged air-fuel ratio AFrich or less and the target air-fuel ratio is switched to the rich air-fuel ratio when the estimated value of the oxygen storage amount OSA of the upstream side exhaust purification catalyst 20 becomes the switching reference storage amount Cref or more. However, the normal air-fuel ratio control need not necessarily be control like in the above embodiment so long as using the output of the upstream side air-fuel ratio sensor 40 and the output of the downstream side air-fuel ratio sensor 41 to control the air-fuel ratio.

For example, as the normal air-fuel ratio control, the following such control may be considered. That is, the target air-fuel ratio is switched to the lean air-fuel ratio when the output air-fuel ratio AFdwn of the downstream side air-fuel ratio sensor 41 becomes the rich judged air-fuel ratio AFrich or less. After that, the target air-fuel ratio is maintained at the lean air-fuel ratio until the output air-fuel ratio AFdwn of the downstream side air-fuel ratio sensor 41 becomes the lean judged air-fuel ratio AFClean or more. In addition, the target air-fuel ratio is switched to the rich air-fuel ratio when the output air-fuel ratio AFdwn of the downstream side air-fuel ratio sensor 41 becomes the lean judged air-fuel ratio AFClean or more. After that, the target air-fuel ratio is maintained at the rich air-fuel ratio until the output air-fuel ratio AFdwn of the downstream side air-fuel ratio sensor 41 becomes the rich judged air-fuel ratio AFrich or less. According to this control, the oxygen storage amount OSA of the upstream side air-fuel ratio sensor 40 can be made to fluctuate between the vicinity of zero and the vicinity of the maximum storable oxygen amount Cmax. By making the oxygen storage amount OSA fluctuate up and down in this way, it is possible to maintain high the oxygen storage ability of the upstream side exhaust purification catalyst 20. In this case as well, the output air-fuel ratio of the upstream side air-fuel ratio sensor 40 (that is, the air-fuel ratio of the exhaust gas flowing into the upstream side exhaust purification catalyst 20) is alternately switched between the rich air-fuel ratio and lean air-fuel ratio.

Further, in the above embodiment, when the internal combustion engine is restarted after automatic stop, the heating by the heater part 56 of the downstream side air-fuel ratio sensor 41 is started at the same time as restart. However, the timing of start of the heating by the heater part 56 may also be changed in accordance with the temperature of the upstream side exhaust purification catalyst 20 at the time of restart of the internal combustion engine.

Specifically, when the temperature of the upstream side exhaust purification catalyst 20 at the time of restart of the internal combustion engine is low (for example, less than 100° C.), it is also possible not to perform the heating by the heater part 56 until the temperature around the downstream side air-fuel ratio sensor 41 or the temperature of the upstream side exhaust purification catalyst 20 becomes 100° C. or more. This is because if the temperature of the downstream side air-fuel ratio sensor 41 is less than 100° C., sometimes condensed water is formed inside the downstream side air-fuel ratio sensor 41 while stopping the internal combustion engine. If starting the heating by the heater part 56 in the state where condensed water is produced in this way, there is a possibility of the downstream side air-fuel ratio sensor 41 cracking. As opposed to this, by performing the heating by the heater part 56 after the temperature etc. around the downstream side air-fuel ratio sensor 41 becomes 100° C. or more, it is possible to keep the downstream side air-fuel ratio sensor 41 from cracking.

What is claimed is:

1. A system for an internal combustion engine, the system comprising:
    an electronic control unit,
    an exhaust purification catalyst provided in an exhaust passage;
    an upstream side air-fuel ratio sensor provided in the exhaust passage at an upstream side of the exhaust purification catalyst in the direction of flow of exhaust;
    a downstream side air-fuel ratio sensor provided in the exhaust passage at a downstream side of the exhaust purification catalyst in the direction of flow of exhaust;
    an upstream side sensor heater heating the upstream side air-fuel ratio sensor; and
    a downstream side sensor heater heating the downstream side air-fuel ratio sensor,
    wherein the internal combustion engine has an automatic stop function,
    wherein the electronic control unit is configured to:
    control an air-fuel ratio of exhaust gas flowing into the exhaust purification catalyst;
    control heating of the upstream side air-fuel ratio sensor by the upstream side sensor heater and heating of the downstream air-fuel sensor by the downstream side sensor heater;
    control the upstream side sensor heater and the downstream side sensor heater so that the temperature of the upstream side air-fuel ratio sensor is an activation temperature of the sensors or more and so that the temperature of the downstream side air-fuel ratio sensor is less than the activation temperature of the sensors during a period from the automatic stop of the internal combustion engine until a restart of the internal combustion engine;
    control the air-fuel ratio of the exhaust gas flowing into the exhaust purification catalyst based on an output of the upstream side air-fuel ratio sensor and an output of the downstream side air-fuel ratio sensor during an engine operation; and
    control the air-fuel ratio of the exhaust gas flowing into the exhaust purification catalyst temporarily based on the output of the upstream side air-fuel ratio sensor without using the output of the downstream side air-fuel ratio sensor even during the engine operation when the internal combustion engine is restarted after the automatic stop, until the temperature of the downstream side air-fuel ratio sensor has reached the activation temperature or more.

2. The system for the internal combustion engine according to claim 1 wherein
    the electronic control unit is further configured to control the upstream side sensor heater so that the temperature of the upstream side air-fuel ratio sensor is lower during the automatic stop of the internal combustion engine compared to during the engine operation.

3. The system for the internal combustion engine according to claim 1 wherein
    the electronic control unit is further configured to control the downstream side sensor heater so that the temperature of the downstream side air-fuel ratio sensor is the activation temperature or more after the internal combustion engine is restarted after the automatic stop.

4. The system for an internal combustion engine according to claim 1 wherein
    the electronic control unit air fuel ratio control part is further configured to control the air-fuel ratio of the exhaust gas flowing in so that the air-fuel ratio corresponding to the output of the upstream side air-fuel ratio sensor becomes the stoichiometric air-fuel ratio when controlling the air-fuel ratio of the exhaust gas flowing into the exhaust purification catalyst based on the output of the upstream side air-fuel ratio sensor without using the output of the downstream side air-fuel ratio sensor.

5. The system for an internal combustion engine according to claim 1 wherein
    the electronic control unit air fuel ratio control part is further configured to control the air-fuel ratio of the exhaust gas flowing in so that the air-fuel ratio corresponding to the output of the upstream side air-fuel ratio sensor alternately changes between a rich air-fuel ratio richer than the stoichiometric air-fuel ratio and a lean air-fuel ratio leaner than the stoichiometric air-fuel ratio when controlling the air-fuel ratio of the exhaust gas flowing into the exhaust purification catalyst based on the output of the upstream side air-fuel ratio sensor and the output of the downstream side air-fuel ratio sensor.

* * * * *